US012592195B2

(12) United States Patent
Park et al.

(10) Patent No.: US 12,592,195 B2
(45) Date of Patent: Mar. 31, 2026

(54) DISPLAY PANEL AND DISPLAY SYSTEM INCLUDING THE SAME

(71) Applicant: Samsung Display Co., Ltd., Yongin-si (KR)

(72) Inventors: Do Yeong Park, Yongin-si (KR); Kwi Hyun Kim, Yongin-si (KR); Se Hyun Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/884,480

(22) Filed: Sep. 13, 2024

(65) Prior Publication Data

US 2025/0252915 A1 Aug. 7, 2025

(30) Foreign Application Priority Data

Feb. 2, 2024 (KR) ........................ 10-2024-0016873

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0426* (2013.01)

(58) Field of Classification Search
CPC . G09G 3/32; G09G 3/3233; G09G 2300/0426
See application file for complete search history.

(56) References Cited

U.S. PATENT DOCUMENTS

| | | | | |
|---|---|---|---|---|
| 10,192,935 | B2 | 1/2019 | Shim et al. | |
| 10,374,026 | B2 | 8/2019 | Lee et al. | |
| 10,680,054 | B2 | 6/2020 | Ka et al. | |
| 11,955,058 | B2 * | 4/2024 | Zhai | G09G 3/2081 |
| 2023/0317907 | A1 | 10/2023 | Park et al. | |
| 2023/0371329 | A1 | 11/2023 | Shang et al. | |
| 2024/0373672 | A1 * | 11/2024 | Liu | H10K 59/121 |
| 2024/0389407 | A1 * | 11/2024 | Chen | H10K 59/131 |

FOREIGN PATENT DOCUMENTS

| | | | |
|---|---|---|---|
| KR | 10-2039838 | | 11/2019 |
| KR | 1020230033660 | A | 3/2023 |
| KR | 102584959 | B1 | 9/2023 |
| KR | 1020230134649 | A | 9/2023 |
| KR | 102592010 | B1 | 10/2023 |

* cited by examiner

*Primary Examiner* — Kenneth B Lee, Jr.

(74) *Attorney, Agent, or Firm* — CANTOR COLBURN LLP

(57) ABSTRACT

A display panel includes first and second sub-pixels, a 2a-th power line, and a 2b-th power line. The first sub-pixel is configured to emit light in a first range of wavelengths. The second sub-pixel is positioned in a first direction from the first sub-pixel and is configured to emit light in a second range of wavelengths. The 2a-th power line extends in the first direction and respectively overlaps the first and the second sub-pixels in a third direction. The 2a-th power line includes a bridge pattern extending from the 2a-th power line in a second direction. The 2a-th power line is electrically connected to the first sub-pixel through the bridge pattern. The 2b-th power line bypasses the bridge pattern and extends in the first direction. The 2b-th power line respectively overlaps the first and the second sub-pixels in the third direction and is electrically connected to the second sub-pixel.

20 Claims, 19 Drawing Sheets

DISPLAY PANEL AND DISPLAY SYSTEM INCLUDING THE SAME

CROSS-REFERENCE TO RELATED APPLICATION(S)

This U.S. non-provisional patent application claims priority to and the benefits of Korean Patent Application No. 10-2024-0016873 under 35 U.S.C. § 119, filed in the Korean Intellectual Property Office on Feb. 2, 2024, the entire contents of which are hereby incorporated by reference.

BACKGROUND

1. Technical Field

The disclosure generally relates to a display panel and a display system including the display panel.

2. Description of the Related Art

With the development of information technology, the importance of a display device, which is a connection medium between a user and information, has been emphasized. Owing to the importance of the display device, the use of various display devices, such as a liquid crystal display device, an organic light-emitting display device, and an inorganic light-emitting display device, has increased.

Some display devices have been gradually reduced in size. Accordingly, the size of pixels (or sub-pixels) in the display devices (or display panels) has also gradually decreased. To reduce the size of such a pixel (or sub-pixel), a scheme of stacking, in a vertical direction, circuit elements of a sub-pixel circuit constituting the pixel and a power line provided to supply power to the sub-pixel circuit on each other may be used.

However, to stack the circuit elements and the power line on each other in the vertical direction, several sheets of masks are typically used, thus increasing the time for a display panel fabrication process. Therefore, there is a need for a scheme that provides a display panel in which the sub-pixels and the power line are spatially and efficiently arranged.

The background provided herein is for the purpose of generally presenting the context of the disclosure. Work of the presently named inventors, to the extent that it is described in this background section, as well as aspects of the description that may not otherwise qualify as prior art at the time of filing, are neither expressly nor impliedly admitted as prior art against the disclosure.

SUMMARY

Some aspects provide a display panel in which a power line and sub-pixels are efficiently arranged.

Some aspects provide a display system including a display panel in which a power line and sub-pixels are efficiently arranged.

Additional aspects will be set forth in the detailed description, which follows, and in part, will be apparent from the disclosure, or may be learned by practice of the disclosed embodiments and/or the claimed subject matter.

According to some embodiments, a display panel includes a first sub-pixel, a second sub-pixel, a 2a-th power line, and a 2b-th power line. The first sub-pixel is configured to emit light in a first range of wavelengths. The second sub-pixel is positioned in a first direction from the first sub-pixel. The second sub-pixel is configured to emit light in a second range of wavelengths different from the first range of wavelengths. The 2a-th power line extends in the first direction and respectively overlaps both the first sub-pixel and the second sub-pixel in a third direction transverse to the first direction. The 2a-th power line includes a bridge pattern extending from the 2a-th power line in a second direction transverse to both the first direction and the third direction. The 2a-th power line is electrically connected to the first sub-pixel through the bridge pattern. The 2b-th power line bypasses the bridge pattern and extends in the first direction. The 2b-th power line respectively overlaps both the first sub-pixel and the second sub-pixel in the third direction. The 2b-th power line is electrically connected to the second sub-pixel.

In some embodiments, the 2a-th power line and the 2b-th power line may be adjacent to each other in the second direction.

In some embodiments, both the 2a-th power line and the 2b-th power line are configured to apply power voltages of different levels to the first sub-pixel and the second sub-pixel, respectively.

In some embodiments, the display panel may further include a gate line extending in the first direction. The gate line may be electrically connected to both the first sub-pixel and the second sub-pixel. The gate line may be positioned between the 2a-th power line and the 2b-th power line in the second direction.

In some embodiments, the bridge pattern may overlap a portion of the gate line in the third direction.

In some embodiments, the 2a-th power line may not be electrically connected to the second sub-pixel, and the 2b-th power line may not be electrically connected to the first sub-pixel.

In some embodiments, both the first sub-pixel and the second sub-pixel may respectively include a pulse width modulation circuit, a connection electrode, a pixel driving circuit, and a light-emitting element. The pulse width modulation circuit may be configured to generate an emission control signal having a pulse width corresponding to a data signal. The connection electrode may be electrically connected to the pulse width modulation circuit. The connection electrode may be configured to receive the emission control signal. The pixel driving circuit may be electrically connected to the connection electrode. The pixel driving circuit may be configured to generate a driving current during a period corresponding to the pulse width of the emission control signal. The light-emitting element may be electrically connected between the pixel driving circuit and a fourth power line different from the 2a-th power line and the 2b-th power line. The light-emitting element may be configured to emit light in response to a flow of the driving current. The 2a-th power line may be electrically connected to the pulse width modulation circuit of the first sub-pixel. The 2b-th power line may be electrically connected to the pulse width modulation circuit of the second sub-pixel.

In some embodiments, the pulse width modulation circuit may include a first transistor, a second transistor, a third transistor, a fourth transistor, a fifth transistor, and a sixth transistor. The first transistor may include a gate electrode electrically connected to a first node. The first transistor may be electrically connected between a second node and a third node. The second transistor may include a gate electrode electrically connected to a first gate line. The second transistor may be configured to switch electrical connection between the third node and a data line. The third transistor may include a gate electrode electrically connected to the first gate line. The third transistor may be configured to switch electrical connection between the first node and the second node. The fourth transistor may include a gate electrode electrically connected to an emission control line. The fourth transistor may be configured to switch electrical connection between a first power line and the third node. The first power line may be different from each of the 2a-th power line, the 2b-th power line, and the fourth power line. The fifth transistor may include a gate electrode electrically connected to the emission control line. The fifth transistor may be configured to switch electrical connection between the second node and a fourth node. The sixth transistor may include a gate electrode electrically connected to a second gate line different from the first gate line. The sixth transistor may be configured to switch electrical connection between the first node and a fifth node. The 2a-th power line may be electrically connected to the fifth node of the first sub-pixel, and the 2b-th power line may be electrically connected to the fifth node of the second sub-pixel.

In some embodiments, each of the first transistor, the fourth transistor, and the fifth transistor may respectively include a semiconductor layer forming a corresponding portion of a first active pattern layer. Each of the second transistor, the third transistor, and the sixth transistor may respectively include a semiconductor layer forming a corresponding portion of a second active pattern layer different from the first active pattern layer. The first active pattern layer may include a P-type semiconductor layer, and the second active pattern layer may include an N-type semiconductor layer.

In some embodiments, the connection electrode may be electrically connected to the fourth node.

In some embodiments, the pulse width modulation circuit may include a first capacitor. The first capacitor may include a first electrode electrically connected to the first node, and a second electrode electrically connected to a sweep line.

In some embodiments, the pixel driving circuit may include a seventh transistor, an eighth transistor, a ninth transistor, a tenth transistor, a second capacitor, and a third capacitor. The seventh transistor may include a gate electrode electrically connected to the fourth node. The seventh transistor may be electrically connected to a sixth node. The eighth transistor may include a gate electrode electrically connected to the emission control line. The eighth transistor may be configured to switch electrical connection between a third power line and the seventh transistor. The third power line may be different from each of the first power line, the 2a-th power line, the 2b-th power line, and the fourth power line. The ninth transistor may include a gate electrode electrically connected to a third gate line different from both the first gate line and the second gate line. The ninth transistor may be configured to switch electrical connection between the fourth node and the fifth node. The tenth transistor may include a gate electrode electrically connected to a fourth gate line. The tenth transistor may be configured to switch electrical connection between a fifth power line and the sixth node. The fifth power line may be different from each of the first power line, the 2a-th power line, the 2b-th power line, the third power line, and the fourth power line. The second capacitor may include a first electrode electrically connected to the third power line, and a second electrode electrically connected to the fourth node. The third capacitor may include a first electrode electrically connected to the fourth node, and a second electrode electrically connected to the sixth node.

In some embodiments, each of the seventh transistor, the eighth transistor, and the tenth transistor may respectively include a semiconductor layer forming a corresponding portion of the first active pattern layer. The ninth transistor may include a semiconductor layer forming a corresponding portion of the second active pattern layer.

In some embodiments, each of the first gate line, the second gate line, and the third gate line may form a corresponding portion of a gate electrode layer. Each of the fourth gate line, the first power line, the 2a-th power line, the 2b-th power line, the sweep line, and the emission control line may form a corresponding portion of a first source-drain electrode layer disposed on the gate electrode layer. Each of the data line, the fourth power line, and the fifth power line may form a corresponding portion of a second source-drain electrode layer disposed on the first source-drain electrode layer.

In some embodiments, the pulse width modulation circuit and the pixel driving circuit may be adjacent to each other in the second direction. The connection electrode may extend in the second direction and may respectively overlap both the 2a-th power line and the 2b-th power line in the third direction.

In some embodiments, the light-emitting element may include a flip-chip-type light-emitting element.

In some embodiments, the bridge pattern extending from the 2a-th power line may include a first bridge pattern. The display panel may further include a third sub-pixel and a 3a-th power line. The third sub-pixel may be positioned in a first direction from the second sub-pixel. The third sub-pixel may be configured to emit light in a third range of wavelengths different from both the first range of wavelengths and the second range of wavelengths. The 3a-th power line may extend in the first direction and may respectively overlap each of the first sub-pixel, the second sub-pixel, and the third sub-pixel in the third direction. The 3a-th power line may be different from both the 2a-th power line and the 2b-th power line. The 3a-th power line may include a second bridge pattern extending from the 3a-th power line in the second direction and may be electrically connected to the third sub-pixel through the second bridge pattern. The 2b-th power line may extend in the first direction and may bypass both the first bridge pattern and the second bridge pattern.

In some embodiments, the first sub-pixel, the second sub-pixel, and the third sub-pixel may be sequentially adjacent to each other in the first direction.

In some embodiments, the first sub-pixel, the third sub-pixel, and the second sub-pixel may be sequentially adjacent to each other in the first direction.

According to some embodiments, a display system may include a processor and a display device. The processor may be configured to provide both image data and a control signal. The display device may include a display panel configured to receive the image data and the control signal, and to display an image corresponding to the image data in response to the control signal. The display panel may include a first sub-pixel, a second sub-pixel, a 2a-th power line, and a 2b-th power line. The first sub-pixel may be configured to emit light in a first range of wavelengths. The second sub-pixel may be positioned in a first direction from the first sub-pixel. The second sub-pixel may be configured to emit light in a second range of wavelengths different from the first range of wavelengths. The 2a-th power line may extend in the first direction and may respectively overlap both the first sub-pixel and the second sub-pixel in a third direction transverse to the first direction. The 2a-th power line may include a bridge pattern extending from the 2a-th power line in a second direction transverse to both the first direction and the third direction. The 2a-th power line may be electrically connected to the first sub-pixel through the bridge pattern. The 2b-th power line may bypass the bridge pattern and may extend in the first direction. The 2b-th power line may respectively overlap both the first sub-pixel and the second sub-pixel in the third direction. The 2b-th power line may be electrically connected to the second sub-pixel.

The foregoing general description and the following detailed description are illustrative and explanatory and are intended to provide further explanation of the claimed subject matter.

BRIEF DESCRIPTION OF THE DRAWINGS

Various embodiments disclosed herein are illustrated by way of example, and not by way of limitation, in the figures of the accompanying drawings, in which like reference numerals and/or characters refer to similar elements.

DETAILED DESCRIPTION OF THE EMBODIMENTS

Figure 1:
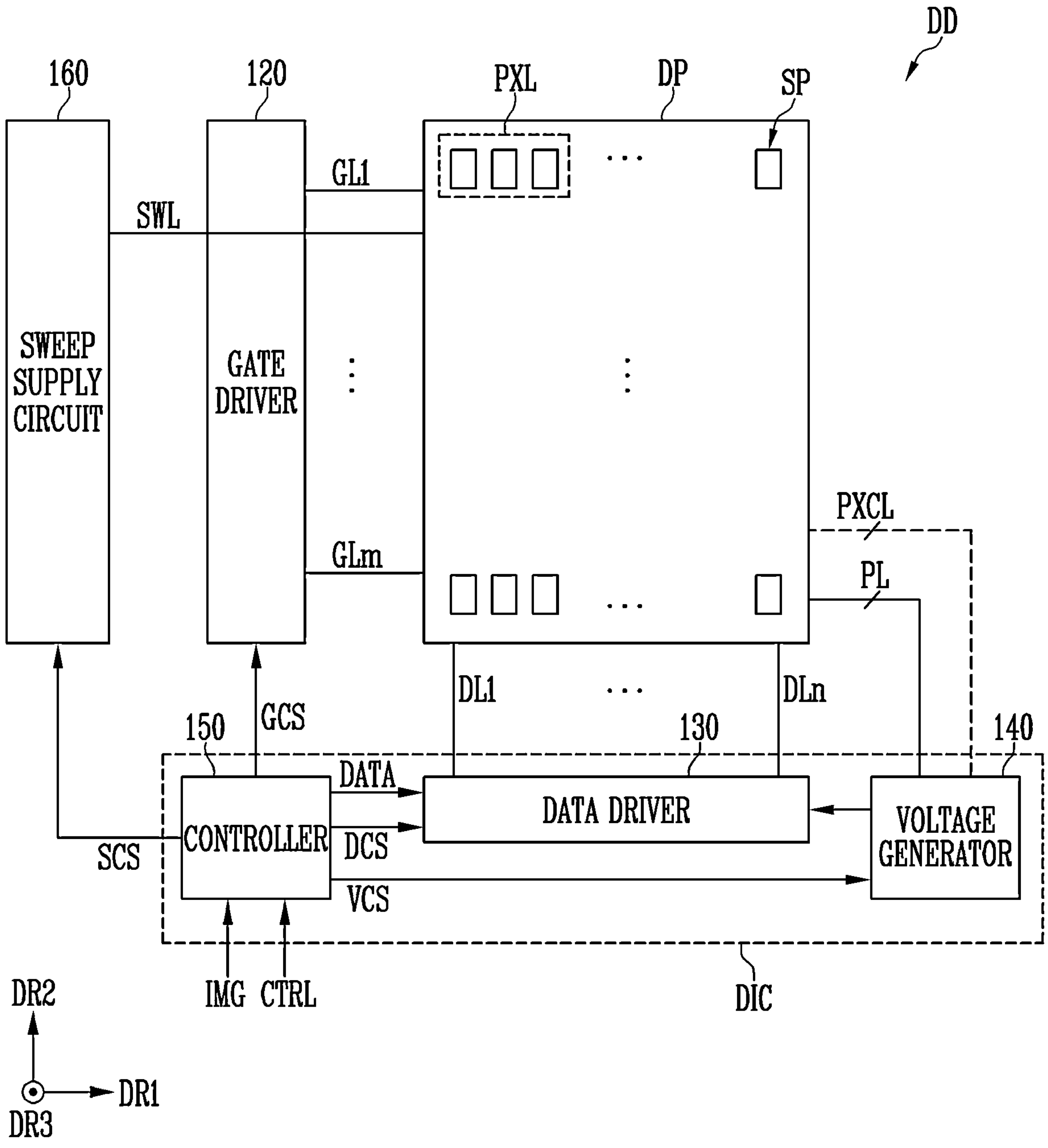
FIG. 1 schematically illustrates a block diagram of a display device according to some embodiments.

In the following description, for the purposes of explanation, numerous specific details are set forth to provide a thorough understanding of various embodiments or implementations. The terms "embodiments" and "implementations" may be used interchangeably to describe one or more non-limiting examples of systems, apparatuses, methods, etc., described herein. It is apparent, however, that various embodiments may be practiced without these specific details or with one or more equivalent arrangements. In other instances, well-known structures and devices are shown in block diagram form to avoid unnecessarily obscuring various embodiments. Further, various embodiments may be different, but do not have to be exclusive. For example, specific shapes, configurations, and characteristics of an embodiment may be used or implemented in another embodiment without departing from the teachings of the disclosure.

Unless otherwise specified, the illustrated embodiments are to be understood as providing example features of varying detail of some embodiments. Thus, unless otherwise specified, the features, components, modules, layers, films, regions, aspects, structures, etc. (hereinafter individually or collectively referred to as an "element" or "elements"), of the various illustrations may be otherwise combined, separated, interchanged, and/or rearranged without departing from the teachings of the disclosure.

The use of cross-hatching and/or shading in the accompanying drawings is generally provided to clarify boundaries between adjacent elements. As such, neither the presence nor the absence of cross-hatching or shading is intended to convey or indicate any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an embodiment may be implemented differently, a specific process order may be performed differently from the described order. For example, two consecutively described processes may be performed substantially at the same time or performed in an order opposite the described order. Also, like reference numerals and/or reference characters denote like elements.

When an element, such as a layer, is referred to as being "on," "over," "connected to (or with)," or "coupled to (or with)" another element, it may be directly on, directly over, directly connected to (or with), or directly coupled to (or with) the other element or at least one intervening element may be present. When, however, an element is referred to as being "directly on," "directly over," "directly connected to (or with)," or "directly coupled to (or with)" another element, there are no intervening elements present. Other terms and/or phrases, if used herein, to describe a relationship between elements should be interpreted in a like fashion, such as "between" versus "directly between," "adjacent" versus "directly adjacent," "on" versus "directly on," "contacting" versus "directly contacting," "touching" versus "directly touching," etc. Further, the term "connected" may refer to physical, electrical, and/or fluid connection. To this end, for the purposes of this disclosure, the phrase "fluidically connected" may be used with respect to volumes, plenums, holes, openings, etc., that may be connected to one another, either directly or via one or more intervening components or volumes, to form a fluidic connection, similar to how the phrase "electrically connected" is used with respect to components that are connected to form an electric connection.

For the purposes of this disclosure, a first axis extending along a first direction DR1, a second axis extending along a second direction DR2, and a third axis extending along a third direction DR3 are not limited to three axes of a rectangular coordinate system, such as x, y, and z axes of a Cartesian coordinate system, and may be interpreted in a broader sense. For example, the first axis, the second axis, and the third axis may be perpendicular to one another, or may represent different directions that are not perpendicular to one another. Further, if used herein, the phrases "at least one of X, Y, . . . , and Z" and "at least one selected from the group consisting of X, Y, . . . , and Z" may be construed as X only, Y only, . . . , Z only, or any combination of two or more of X, Y, . . . , and Z, such as, for instance, XYZ, XYY, YZ, and ZZ. Also, if used herein, the term "and/or" includes any and all combinations of one or more of the associated listed items.

Although the terms "first," "second," "third," etc., may be used herein to describe various elements, these elements should not be limited by these terms. These terms are used to distinguish one element from another element. Thus, a first element discussed below could be termed a second element without departing from the teachings of the disclosure. To this end, use of such identifiers, e.g., "a first element," should not be read as suggesting, implicitly or inherently, that there is necessarily another instance, e.g., "a second element."

Spatially relative terms, such as "beneath," "below," "under," "lower," "above," "upper," "over," "higher," "side" (e.g., as in "sidewall"), and the like, may be used herein for descriptive purposes, and thereby, to describe one element's spatial relationship to at least one other element as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" or "over" the other elements or features. Thus, the term "below" can encompass both an orientation of above and below. Furthermore, the apparatus may be otherwise oriented (e.g., rotated 90 degrees or at other orientations), and as such, the spatially relative descriptors used herein interpreted accordingly.

The terminology used herein is for the purpose of describing some embodiments and is not intended to be limiting. As used herein, the singular forms, "a," "an," and "the" are intended to include the plural forms as well, unless the context clearly indicates otherwise. It is to be understood that the phrases "for each <item> of the one or more <items>," "each <item> of the one or more <items>," and/or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite dictionary definitions of "each" frequently defining the term to refer to "every one of two or more things") and would not imply that there must be at least two of those items. Similarly, the term "set" or "subset" should not be viewed, in and of itself, as necessarily encompassing a plurality of items—it is to be understood that a set or a subset can encompass only one member or multiple members (unless the context indicates otherwise).

The terms "comprises," "comprising," "includes," "including," "has," "have," and/or "having" when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," "approximately," and other similar terms, are used as terms of approximation and not as terms of degree, and as such, are utilized to account for inherent deviations in measured, calculated, and/or provided values that would be recognized by one of ordinary skill in the art. Accordingly, the term "substantially," if used herein, and unless otherwise specified, may mean within 5% of a referenced value. For example, substantially perpendicular may mean within ±5% of being parallel. Moreover, the term "between," if used herein in association with a range of values, is to be understood, unless otherwise indicated, as being inclusive of the start and end values of the range. For example, between 1 and 5 is to be understood as being inclusive of the numbers 1, 2, 3, 4, and 5, not just the numbers 2, 3, and 4.

Various embodiments are described herein with reference to sectional views, isometric views, perspective views, orthographic views, and/or exploded illustrations that are schematic depictions of idealized embodiments and/or intermediate structures. As such, variations from the shapes of the illustrations because of, for example, manufacturing techniques and/or tolerances, are to be expected. Thus, embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and as such, are not intended to be limiting.

As customary in the field, some embodiments may be described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the disclosure. Further, the blocks, units, and/or modules of some embodiments may be physically combined into more complex blocks, units, and/or modules without departing from the scope of the disclosure.

Unless otherwise defined, all terms (including technical and scientific terms) used herein have the same meaning as commonly understood by one of ordinary skill in the art to which this disclosure pertains. Terms, such as those defined in commonly used dictionaries, should be interpreted as having a meaning that is consistent with their meaning in the context of the relevant art and are not to be interpreted in an idealized or overly formal sense, unless expressly so defined herein.

Hereinafter, various embodiments will be described in detail with reference to the accompanying drawings.

FIG. 1 schematically illustrates a block diagram of a display device DD according to some embodiments.

Referring to FIG. 1, the display device DD may include a display panel DP, a gate driver 120, a data driver 130, a voltage generator 140, a sweep supply circuit 160, and a controller 150.

The display panel DP may include sub-pixels SP. The sub-pixels SP may be electrically connected to the gate driver 120 through first to m-th gate lines GL1 to GLm (where m is an integer of 1 or more). The sub-pixels SP may be electrically connected to the data driver 130 through first to n-th data lines DL1 to DLn (where n is an integer of 1 or more).

The sub-pixels SP may generate light of two or more colors. For example, each of the sub-pixels SP may generate light of a color, such as red, green, blue, cyan, magenta, or yellow. Embodiments, however, are not limited thereto. For instance, at least one of the sub-pixels SP may generate white light or any other suitable color of light.

Two or more sub-pixels SP among the sub-pixels SP may form one pixel PXL. For example, the pixel PXL may include three sub-pixels SP, as illustrated in FIG. 1. As such, the pixel PXL may emit light of various colors and various luminances depending on the combination of light emitted from the sub-pixels SP included therein.

The gate driver 120 may be electrically connected to sub-pixels SP arranged in a first (e.g., row) direction DR1 through the first to m-th gate lines GL1 to GLm. The gate driver 120 may output gate signals to the first to m-th gate lines GL1 to GLm in response to a gate control signal GCS. In some embodiments, the gate control signal GCS may include a start signal instructing each frame to start, a horizontal synchronization signal, and/or the like.

The gate driver 120 may be disposed on a (e.g., one) side of the display panel DP. However, embodiments are not limited to the aforementioned example(s). For example, the gate driver 120 may be divided into two or more drivers that are physically and/or logically distinguished from each other. The drivers may be disposed on a first side of the display panel DP and a second side of the display panel DP opposite to the first side, such as opposite to the first side in the first direction DR1. As such, the gate driver 120 may be disposed around (or adjacent to) the display panel DP in various forms depending on the configuration of the display panel DP.

The data driver 130 may be electrically connected to sub-pixels SP arranged in a second (e.g., column) direction DR2 through the first to n-th data lines DL1 to DLn. In some implementations, the second direction DR2 may be transverse (e.g., orthogonal) to the first direction DR1. The data driver 130 may receive image data DATA and a data control signal DCS from the controller 150. The data driver 130 may operate in response to the data control signal DCS. In some embodiments, the data control signal DCS may include a source start signal, a source shift clock signal, a source output enable signal, and/or the like.

The data driver 130 may receive voltages from the voltage generator 140. The data driver 130 may apply, using the received voltages, data signals having grayscale voltages corresponding to the image data DATA to the first to n-th data lines DL1 to DLn. In response to at least one gate signal applied to each of the first to m-th gate lines GL1 to GLm, data signals corresponding to the image data DATA may be applied to the data lines DL1 to DLn. The sub-pixels SP may generate light corresponding to the data signals, and the display panel DP may display an image.

In some embodiments, the gate driver 120 and the data driver 130 may include complementary metal-oxide semiconductor (CMOS) circuit elements. Embodiments, however, are not limited thereto.

The voltage generator 140 may operate in response to a voltage control signal VCS provided from the controller 150. The voltage generator 140 may be configured to generate a plurality of voltages and provide the generated voltages to one or more components of the display device DD, such as the gate driver 120, the data driver 130, and the controller 150. The voltage generator 140 may receive an input voltage from a device (such as a device external to the display device DD) and generate a plurality of voltages by regulating the received input voltage.

The voltage generator 140 may generate two or more voltages, such as two or more power voltages. The generated power voltages may be provided to the sub-pixels SP through power lines PL, only one of which is shown in FIG. 1. In some embodiments, at least one of the power voltages may be provided from a device external to the display device DD.

According to some implementations, the voltage generator 140 may provide various voltages and/or signals. For example, the voltage generator 140 may provide one or more initialization voltages, which may be applied to the sub-pixels SP. For example, during a sensing operation for sensing electrical characteristics of one or more transistors and/or one or more light-emitting elements of the sub-pixels SP, a reference voltage may be applied to each of the first to n-th data lines DL1 to DLn. The voltage generator 140 may generate the reference voltage and transmit the reference voltage to the data driver 130. For example, during a display operation for displaying an image on (or using) the display panel DP, pixel control signals may be applied to the sub-pixels SP, and the voltage generator 140 may generate at least some of the pixel control signals. In some embodiments, the voltage generator 140 may provide one or more of the pixel control signals to the sub-pixels SP through pixel control lines PXCL, one of which is shown in FIG. 1 using a dashed line format. Although in FIG. 1 there is illustrated a case where the pixel control lines PXCL are electrically connected between the voltage generator 140 and the display panel DP, embodiments are not limited thereto. For example, at least one of the pixel control lines PXCL may be electrically connected between the gate driver 120 and the display panel DP. The pixel control signals PXCL may be transmitted from the voltage generator 140 to the pixel control lines PXCL through the gate driver 120.

The sweep supply circuit 160 may provide a sweep signal to the display panel DP. The sweep signal may be, for example, a signal in which a voltage increases (e.g., successively increases) over time. Embodiments, however, are not limited thereto. For instance, the sweep signal may be, for example, a signal that decreases (e.g., sequentially decreases) in voltage over time. In some implementations, the sweep signal may be provided as (or having) a triangle wave. The sweep supply circuit 160 may provide a sweep signal to a sweep line SWL. The sweep line SWL may be electrically connected to multiple sub-pixels SP. The sweep supply circuit 160 may provide a sweep signal to the sweep line SWL in response to a sweep control signal SCS.

In an embodiment, a (e.g., one) sweep line SWL may be electrically connected to multiple sub-pixels SP positioned on (or in) a (e.g., one) row (or one pixel row). In some embodiments, a (e.g., one) sweep line SWL may be electrically connected to multiple sub-pixels SP positioned on (or in) a plurality of rows (or a plurality of pixel rows).

The controller 150 may control overall operations of the display device DD. The controller 150 may receive input image data IMG and a corresponding control signal CTRL from a device, such as a device external to display device DD. The controller 150 may provide a gate control signal GCS, a data control signal DCS, a voltage control signal VCS, and a sweep control signal SCS in response to the control signal CTRL.

The controller 150 may convert the input image data IMG to be suitable for the display device DD or the display panel DP, and output image data DATA. In some embodiments, the controller 150 may align the input image data IMG to be suitable for the sub-pixels SP on a row basis and output the image data DATA.

Two or more components of the data driver 130, the voltage generator 140, and/or the controller 150 may be mounted on (or integrated as part of) a single integrated circuit. As illustrated in FIG. 1, the data driver 130, the voltage generator 140, and the controller 150 may be included in (or as part of) a driver integrated circuit DIC. The data driver 130, the voltage generator 140, and the controller 150 may be components that are functionally separated from each other in the single driver integrated circuit DIC. In some embodiments, at least one of the data driver 130, the voltage generator 140, and the controller 150 may be provided as a component separated (or distinct) from the driver integrated circuit DIC including the remaining components among the data driver 130, the voltage generator 140, and the controller 150.

Figure 2:
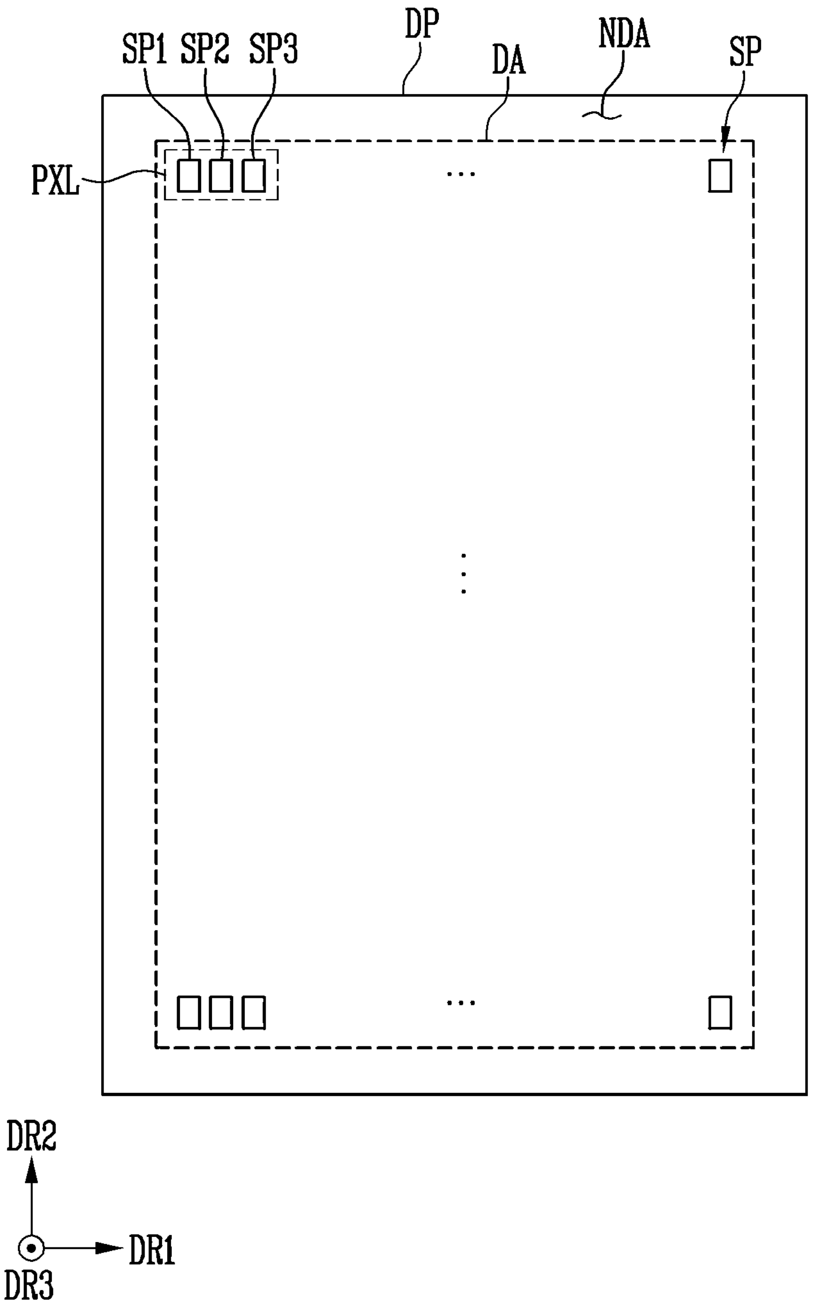
FIG. 2 schematically illustrates an orthographic view of a display panel of the display device of FIG. 1 according to some embodiments.

FIG. 2 schematically illustrates an orthographic view of the display panel DP of the display device DD of FIG. 1 according to some embodiments. For instance, FIG. 2 depicts a plan view of the display panel DP in a case that the display panel DP is viewed in a third direction DR3, which may be transverse (e.g., orthogonal) to both the first direction DR1 and the second direction DR3.

Referring to FIG. 2, the display panel DP may include a display area DA and a non-display area NDA. The display panel DP may display an image through (or in association with) the display area DA. The non-display area NDA may be disposed outside (e.g., adjacent to, around, and/or the like) the display area DA.

The sub-pixels SP may be positioned in the display area DA. The sub-pixels SP may be arranged in the first direction DR1 and the second direction DR2 transverse to the first direction DR1. In an embodiment, the sub-pixels SP may be arranged in the form of a matrix in the first direction DR1 and the second direction DR2. In some implementations, the sub-pixels SP may be arranged in a zigzag form in the first direction DR1 and the second direction DR2. In some cases, the sub-pixels SP may be arranged in a PenTile™ form. It is contemplated, however, that the arrangement of the sub-pixels SP may be changed depending on a configuration of the display panel DP. For example, the first direction DR1 may refer to a row direction, and the second direction DR2 may refer to a column direction, or vice versa. However, embodiments are not limited to the aforementioned example(s).

Two or more sub-pixels among the sub-pixels SP may form a (e.g., one) pixel PXL. Although, referring to FIG. 2, there is illustrated a case where the pixel PXL includes three sub-pixels, e.g., first to third sub-pixels SP1, SP2, and SP3, embodiments are not limited thereto. For example, the pixel PXL may include two sub-pixels, or four or more sub-pixels. Hereinafter, for convenience, it is assumed that the pixel PXL includes first to third sub-pixels SP1 to SP3.

Each of the first to third sub-pixels SP1 to SP3 may generate light of a (e.g., one) color among various colors, such as red, green blue, cyan, magenta, and yellow, but embodiments are not limited to these colors. Hereinafter, for clear and concise description, it is assumed that the first sub-pixel SP1 is configured to generate light in red, the second color pixel SP2 is configured to generate light in green, and the third sub-pixel SP3 is configured to generate light in blue.

Each of the first to third sub-pixels SP1 to SP3 may include at least one light-emitting element configured to generate light. In some embodiments, the light-emitting elements of the first to third sub-pixels SP1 to SP3 may generate light of a same color. For example, the light-emitting elements of the first to third sub-pixels SP1 to SP3 may generate light of a blue color, e.g., light having a wavelength (or range of wavelengths) in a range of about 450 nm to about 495 nm. In some embodiments, the light-emitting elements of the first to third sub-pixels SP1 to SP3 may generate light of different colors from one another. For example, the light-emitting elements of the first to third sub-pixels SP1 to SP3 may respectively generate light of a red color (e.g., light having a wavelength (or range of wavelengths) in a range of about 620 nm to about 750 nm), a green color (e.g., light having a wavelength (or range of wavelengths) in a range of about 500 nm to about 600 nm), and a blue color.

As a display panel DP, a self-luminous display panel, such as a light-emitting diode (LED) display panel using a micro-scale or nano-scale light-emitting diode as a light-emitting element, and/or an organic light-emitting display panel (OLED panel) using an organic light-emitting diode as a light-emitting element may be used. However, embodiments are not limited thereto.

Components for controlling the sub-pixels SP may be disposed in the non-display area NDA, but embodiments are not limited thereto. Lines electrically connected to the sub-pixels SP, for example, the first to m-th gate lines GL1 to GLm, the first to n-th data lines DL1 to DLn, the power lines PL, and the pixel control lines PXCL described in association with FIG. 1, may be disposed in the non-display area NDA.

At least one of the gate driver 120, the data driver 130, the voltage generator 140, the controller 150, and the sweep supply circuit 160 described in association with FIG. 1 may be disposed in the non-display area NDA of the display panel DP. In some embodiments, the gate driver 120 and the sweep supply circuit 160 may be disposed in the non-display area NDA. The data driver 130, the voltage generator 140, and the controller 150 may be implemented as the driver integrated circuit DIC described in association with FIG. 1 that may be separated (or distinct) from, but electrically connected to the display panel DP. The driver integrated circuit DIC may be electrically connected to the lines disposed in the non-display area NDA. In some embodiments, the gate driver 120 along with the data driver 130, the voltage generator 140, and the controller 150 may be implemented as a single integrated circuit that is separated (or distinct) from the display panel DP. However, embodiments are not limited to the aforementioned example(s).

In some embodiments, the display area DA may have various shapes in a view in the third direction DR3. The display area DA may have a closed-loop shape, including linear and/or curved sides. For example, the display area DA may have shapes, such as polygons, circles, semicircles, ellipses, and the like, in a view in the third direction DR3.

In some embodiments, the display panel DP may have a planar display surface. In some embodiments, the display panel DP may have a display surface that is at least partially rounded or curved from, for instance, a virtual plane parallel (or substantially parallel) to a DR1-DR2 plane. In some embodiments, the display panel DP may be bendable, foldable, flexible, twistable, and/or rollable. The display panel DP and/or a substrate of the display panel DP may include one or more materials having flexible properties.

Figure 3:
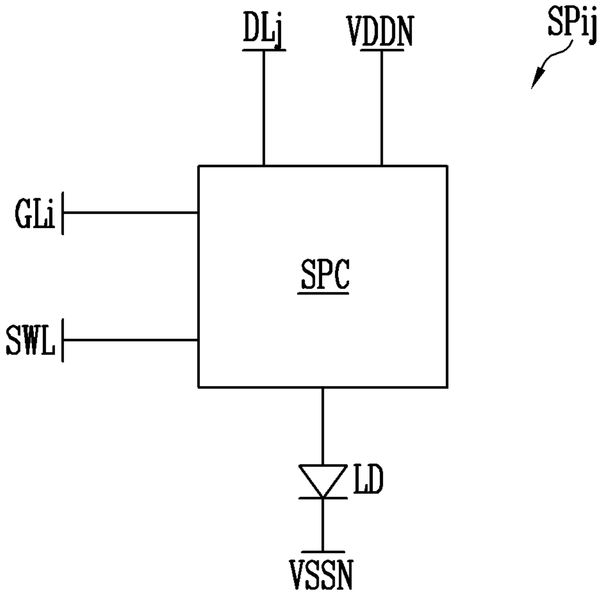
FIG. 3 schematically illustrates a block diagram of any one sub-pixel of the display device of FIG. 1 according to some embodiments.

FIG. 3 schematically illustrates a block diagram of any one sub-pixel SP of the display device of FIG. 1 according to some embodiments.

In FIG. 3, there is illustrated a sub-pixel SPij disposed on an i-th row (where i is an integer equal to or greater than 1 and equal to or less than m) and a j-th column (where j is an integer equal to or greater than 1 and equal to or less than n) among the sub-pixels SP described in association with FIG. 1.

Referring to FIG. 3, the sub-pixel SPij may include a sub-pixel circuit SPC and a light-emitting element LD.

The light-emitting element LD may be electrically connected between a first power voltage node VDDN and a second power voltage node VSSN. The first power voltage node VDDN may be electrically connected to one of the power lines PL described in association with FIG. 1 to receive a first power voltage. The second power voltage node VSSN may be electrically connected to another one of the power lines PL described in association with FIG. 1 to receive a second power voltage different from the first power voltage. In some implementations, the first power voltage may have a voltage level higher than a voltage level of the second power voltage.

The light-emitting element LD may be electrically connected between an anode electrode and a cathode electrode. The anode electrode may be electrically connected to the first power voltage node VDDN through the sub-pixel circuit SPC. For example, the anode electrode may be electrically connected to the first power voltage node VDDN through one or more transistors included in (or as part of) the sub-pixel circuit SPC. The cathode electrode may be electrically connected to the second power voltage node VSSN. The light-emitting element LD may be configured to emit light based on current flowing from the anode electrode to the cathode electrode.

The sub-pixel circuit SPC may be electrically connected both to an i-th gate line GLi among the first to m-th gate lines GL1 to GLm described in conjunction with FIG. 1 and to a j-th data line DLj among the first to n-th data lines DL1 to DLn described in association with FIG. 1. In response to a gate signal received through the i-th gate line GLi, the sub-pixel circuit SPC may control the light-emitting element LD to emit light based on a data signal received through the j-th data line DLj. In some embodiments, the sub-pixel circuit SPC may be electrically connected to the sweep line SWL described in association with FIG. 1.

The sub-pixel circuit SPC may include circuit elements, such as, for example, transistors and one or more capacitors.

The transistors of the sub-pixel circuit SPC may include P-type transistors and/or N-type transistors. In some embodiments, one or more of the transistors of the sub-pixel circuit SPC may include a metal oxide silicon field effect transistor (MOSFET). In some embodiments, one or more of the transistors of the sub-pixel circuit SPC may include an amorphous silicon semiconductor, a monocrystalline silicon semiconductor, a polycrystalline silicon semiconductor, an oxide semiconductor, and/or the like.

Figure 4:
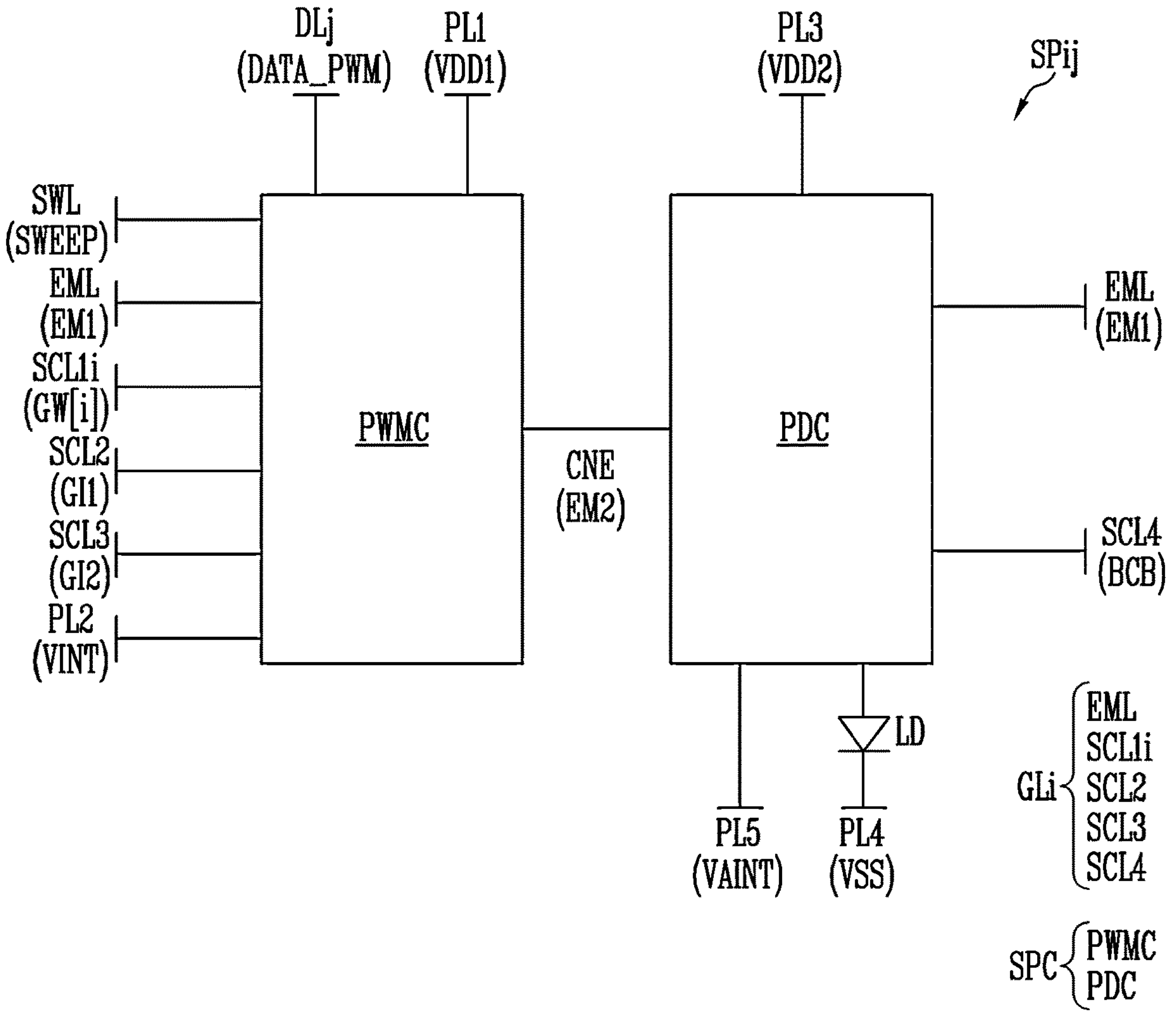
FIG. 4 schematically illustrates a block diagram of a sub-pixel circuit according to some embodiments.

FIG. 4 schematically illustrates a block diagram of the sub-pixel circuit SPC according to some embodiments.

Referring to FIG. 4, the sub-pixel circuit SPC in accordance with some embodiments may be included in the sub-pixel SPij positioned on (or in) the i-th row and the j-th column. The sub-pixel circuit SPC of the sub-pixel SPij positioned on the i-th row and the j-th column may include a pulse width modulation circuit PWMC and a pixel driving circuit PDC.

The pulse width modulation circuit PWMC may be electrically connected to a first power line PL1 and a second power line PL2.

A first power voltage VDD1 may be applied to the first power line PL1. The first power voltage VDD1 may be a voltage of a relatively high potential. A second power voltage VINT may be applied to the second power line PL2.

The pulse width modulation circuit PWMC may be electrically connected to the i-th gate line GLi. The i-th gate line GLi may include a first gate line SCL1*i*, a second gate line SCL2, a third gate line SCL3, and an emission control line EML. In an embodiment, the i-th gate line GLi may include the sweep line SWL.

The first gate line SCL1*i* may be disposed on a row basis (e.g., a pixel row basis). The first gate line SCL1*i* may correspond to the first gate line SCL1*i* positioned on the i-th row. A first scan signal GW[i] may be written to the first gate line SCL1*i*.

The second gate line SCL2 may be electrically connected in common to multiple rows (or multiple pixel rows). In an embodiment, the second gate line SCL2 may be disposed on a row basis (or a pixel row basis). Hereinafter, for the sake of explanation, an embodiment in which the second gate line SCL2 is electrically connected in common to multiple rows will be described as an example. A second scan signal GI1 may be written to the second gate line SCL2.

The third gate line SCL3 may be electrically connected in common to multiple rows (or multiple pixel rows). In an embodiment, the third gate line SCL3 may be disposed on a row basis (or a pixel row basis). Hereinafter, for the sake of explanation, an embodiment in which the third gate line SCL3 is electrically connected in common to multiple rows will be described as an example. A third scan signal GI2 may be written to the third gate line SCL3.

The emission control line EML may be electrically connected in common to multiple rows (or multiple pixel rows). In an embodiment, the emission control line EML may be disposed on a row basis (or a pixel row basis). Hereinafter, for the sake of explanation, an embodiment in which the emission control line EML is electrically connected in common to multiple rows will be described as an example. A first emission control signal EM1 may be written to the emission control line EML.

The sweep line SWL may be electrically connected in common to multiple rows (or multiple pixel rows). In an embodiment, the sweep line SWL may be disposed on a row basis (or a pixel row basis). Hereinafter, for the sake of explanation, an embodiment in which the sweep line SWL is electrically connected in common to multiple rows will be described as an example. A sweep signal SWEEP may be written to the sweep line SWL.

The pulse width modulation circuit PWMC may be electrically connected to the j-th data line DLj. The j-th data line DLj may correspond to the j-th data line DLj positioned on the j-th column (or a j-th sub-pixel column). A data voltage DATA_PWM may be written to the j-th data line DLj positioned on the j-th column.

The pulse width modulation circuit PWMC may be electrically connected to the pixel driving circuit PDC through a connection electrode CNE.

A second emission control signal EM2 may be written to the connection electrode CNE. The width (e.g., pulse width) of the second emission control signal EM2 may correspond to a voltage value of the data voltage DATA_PWM.

The pixel driving circuit PDC may be electrically connected to the light-emitting element LD. The pixel driving circuit PDC may be electrically connected to a third power line PL3 and a fifth power line PL5.

A third power voltage VDD2 may be applied to the third power line PL3. The third power voltage VDD2 may be a voltage of a relatively high potential. A fifth power voltage VAINT may be applied to the fifth power line PL5. The fifth power voltage VAINT may be a voltage of a relatively low potential.

The pixel driving circuit PDC may be electrically connected to the emission control line EML and a fourth gate line SCL4.

The fourth gate line SCL4 may be electrically connected in common to multiple rows (or multiple pixel rows). In an embodiment, the fourth gate line SCL4 may be disposed on a row basis (or a pixel row basis). Hereinafter, for the sake of explanation, an embodiment in which the fourth gate line SCL4 is electrically connected in common to multiple rows will be described as an example. A fourth scan signal BCB may be written to the fourth gate line SCL4.

The light-emitting element LD may be electrically connected between the pixel driving circuit PDC and a fourth power line PL4.

A fourth power voltage VSS may be applied to the fourth power line PL4. The fourth power voltage VSS may be a voltage of a relatively low potential.

The above-described i-th gate line GLi may include the emission control line EML, the first gate line SCL1*i*, the second gate line SCL2, the third gate line SCL3, and the fourth gate line SCL4.

Figure 5:
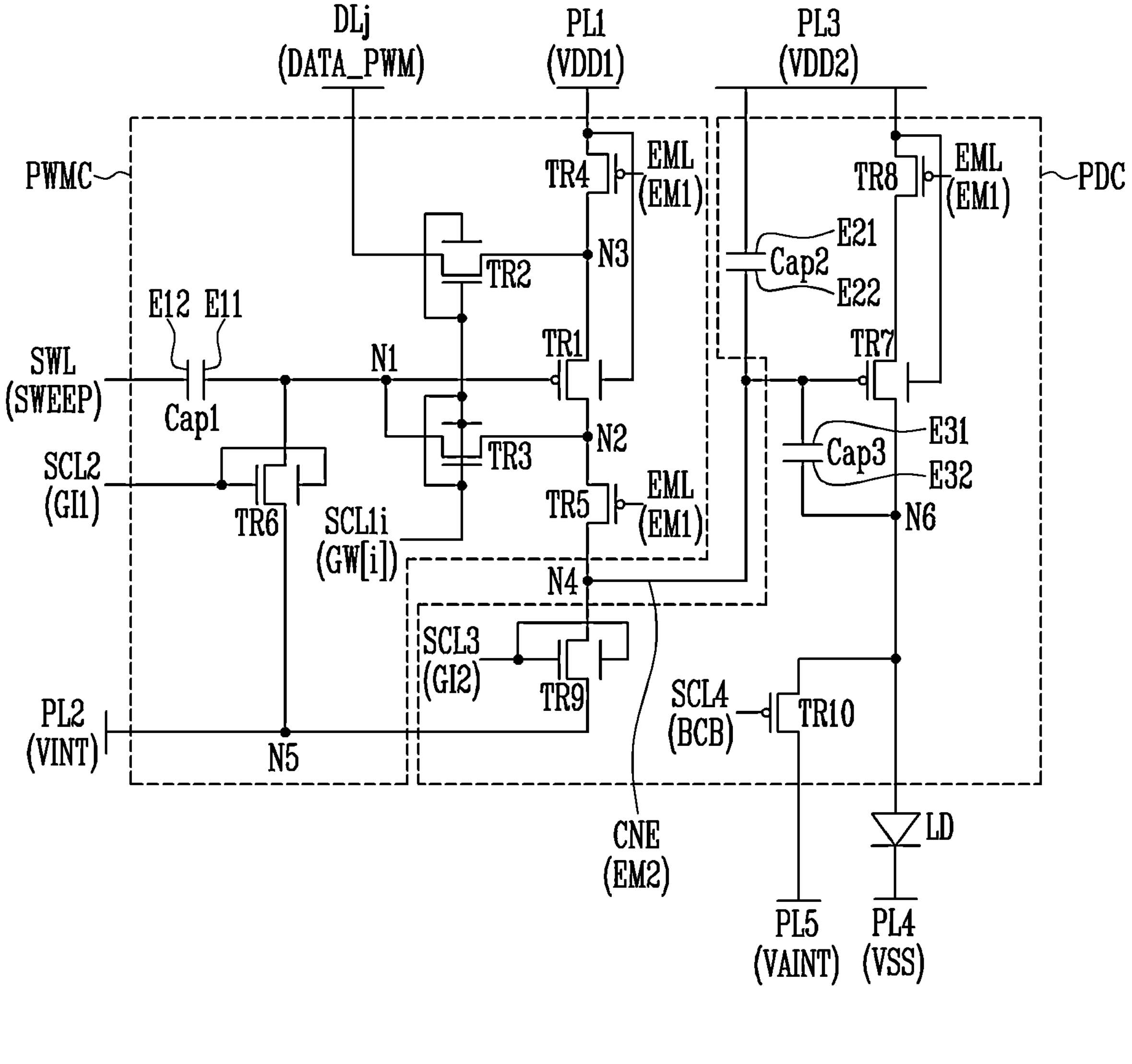
FIG. 5 schematically illustrates an equivalent circuit diagram of a pulse width modulation circuit and a pixel driving circuit according to some embodiments.

FIG. 5 schematically illustrates an equivalent circuit diagram of the pulse width modulation circuit PWMC and the pixel driving circuit PDC according to some embodiments.

The pulse width modulation circuit PWMC in accordance with some embodiments may include a plurality of transistors and at least one capacitor. Referring to FIG. 5, the pulse width modulation circuit PWMC in accordance with some embodiments may include first to sixth transistors TR1 to TR6 and a first capacitor Cap1. However, embodiments are not limited to the foregoing example.

The pixel driving circuit PDC in accordance with some embodiments may include a plurality of transistors and at least one capacitor. Referring to FIG. 5, the pixel driving circuit PDC in accordance with some embodiments may include seventh to tenth transistors TR7 to TR10 and second and third capacitors Cap2 and Cap3.

The first transistor TR1 may include a gate electrode electrically connected to a first node N1. The first transistor TR1 may include a first electrode (e.g., either a source electrode or a drain electrode) electrically connected to a second node N2, and a second electrode (e.g., the other of the source electrode and the drain electrode) electrically connected to a third node N3. The first electrode may be, for example, a source electrode. The second electrode may be, for example, a drain electrode. A body electrode of the first transistor TR1 may be electrically connected to the first power line PL1. The first transistor TR1 may be configured to electrically connect the second node N2 and the third node N3 during a period in which a voltage of a first logic level (e.g., a turn-on level) is applied to the first node N1. Depending on the length of the period during which the first transistor TR1 is turned on, the width of the second emission control signal EM2 output through the connection electrode CNE may adaptively vary.

The second transistor TR2 may be configured to switch electrical connection between the j-th data line DLj and the third node N3. The second transistor TR2 may electrically connect the j-th data line DLi and the third node N3 in response to a first scan signal GW[i] of a first logic level (e.g., a turn-on level). The second transistor TR2 may include a gate electrode electrically connected to the first gate line SCL1*i*. The second transistor TR2 may include a body electrode electrically connected to the first gate line SCL1*i*. In response to the second transistor TR2 being turned on, a data voltage DATA_PWM or a voltage corresponding to the data voltage DATA_PWM may be applied to the third node N3.

The third transistor TR3 may be configured to switch electrical connection between the first node N1 and the second node N2. The third transistor TR3 may electrically connect the second node N2 and the third node N3 to each other in response to a first scan signal GW[i] of a first logic level (e.g., a turn-on level). The third transistor TR3 may include a gate electrode electrically connected to the first gate line SCL1*i*. The third transistor TR3 may include a body electrode electrically connected to the first gate line SCL1*i*. In response to the third transistor TR3 being turned on, the first transistor TR1 may be electrically connected in the form of a diode. Accordingly, a voltage corresponding to the data voltage DATA_PWM applied to the third node N3 may be stored in the first node N1. The third transistor TR3 may function to compensate for a change in characteristic value (e.g., a change in a threshold voltage) of the first transistor TR1.

The first capacitor Cap1 may include a first electrode E11 electrically connected to the first node N1, and a second electrode E12 electrically connected to the sweep line SWL. A sweep signal SWEEP may be applied to the second electrode E12. In response to a voltage of the second electrode E12 varying due to the application of the sweep signal SWEEP to the second electrode E12, a voltage variation of the first electrode E11 may be changed by the effect of maintaining the amount of charges stored in the first capacitor Cap1. Accordingly, the voltage of the first node N1 may vary (e.g., sequentially vary) in response to the sweep signal SWEEP.

The fourth transistor TR4 may be configured to switch electrical connection between the first power line PL1 and the third node N3. The fourth transistor TR4 may electrically connect the first power line PL1 and the third node N3 to each other in response to a first emission control signal EM1 of a first logic level (e.g., a turn-on level). The fourth transistor TR4 may include a gate electrode electrically connected to the emission control line EML. In response to the fourth transistor TR4 being turned on, a first power voltage VDD1 or a voltage corresponding to the first power voltage VDD may be applied to the third node N3. Accordingly, current may flow from the first power line PL1 in a direction toward the first transistor TR1.

The fifth transistor TR5 may be configured to switch electrical connection between the second node N2 and a fourth node N4. The fifth transistor TR5 may electrically connect the second node N2 and the fourth node N4 to each other in response to a first emission control signal EM1 of a first logic level (e.g., a turn-on level). The fifth transistor TR5 may include a gate electrode electrically connected to the emission control line EML. In response to the fifth transistor TR5 being turned on, current may flow from the first power line PL1 in a direction toward the fourth node N4. Accordingly, a second emission control signal EM2 may be applied to the connection electrode CNE, which may be electrically connected to the fourth node N4.

The sixth transistor TR6 may be configured to switch electrical connection between the first node N1 and a fifth node N5. The sixth transistor TR6 may electrically connect the first node N1 and the fifth node N5 to each other in response to a second scan signal GI1 of a first logic level (e.g., a turn-on level). The sixth transistor TR6 may include a gate electrode electrically connected to the second gate line SCL2. The fifth node N5 may be electrically connected to the second power line PL2. The sixth transistor TR6 may include a body electrode electrically connected to the second gate line SCL2. In response to the sixth transistor TR6 being turned on, a second power voltage VINT may be applied to the first node N1. Accordingly, the voltage of the first node N1 may be initialized to the second power voltage VINT.

The pixel driving circuit PDC may include the seventh to tenth transistors TR7 to TR10 and the second and third capacitors Cap2 and Cap3.

The seventh transistor TR7 may include a gate electrode electrically connected to the connection electrode CNE. The seventh transistor TR7 may include a first electrode (e.g., either a source electrode or a drain electrode) electrically connected to the eighth transistor TR8, and a second electrode (e.g., the other of the source electrode and the drain electrode) electrically connected to a sixth node N6. For example, the first electrode may be the source electrode, and the second electrode may be the drain electrode. The seventh transistor TR7 may include a body electrode electrically connected to the third power line PL3. In response to the seventh transistor TR7 being turned on, the eighth transistor TR8 and the sixth node N6 may be electrically connected to each other.

The eighth transistor TR8 may be configured to switch electrical connection between the third power line PL3 and the seventh transistor TR7. The eighth transistor TR8 may electrically connect the third power line PL3 and the seventh transistor TR7 to each other in response to a first emission signal EM1 of a first logic level (e.g., a turn-on level). The eighth transistor TR8 may include a gate electrode electrically connected to the emission control line EML. In response to the eighth transistor TR8 being turned on, current may flow from the third power line PL3 in a direction toward the seventh transistor TR7.

The ninth transistor TR9 may be configured to switch electrical connection between the second power line PL2 and the fourth node N4. The ninth transistor TR9 may electrically connect the second power line PL2 and the fourth node N4 to each other in response to a third scan signal GI2 of a first logic level (e.g., a turn-on level). The ninth transistor TR9 may include a gate electrode electrically connected to the third gate line SCL3. The ninth transistor TR9 may include a body electrode electrically connected to the third gate line SCL3. In response to the ninth transistor TR9 being turned on, a second power voltage VINT may be applied to the fourth node N4. The voltage of the fourth node N4 may be initialized to the second power voltage VINT.

The tenth transistor TR10 may be configured to switch electrical connection between the fifth power line PL5 and the sixth node N6. The tenth transistor TR10 may electrically connect the fifth power line PL5 and the sixth node N6 to each other in response to a fourth scan signal BCB of a first logic level (e.g., a turn-on level). The tenth transistor TR10 may include a gate electrode electrically connected to the fourth gate line SCL4. In response to the tenth transistor TR10 being turned on, a fifth power voltage VAINT may be applied to the sixth node N6. The voltage of the sixth node N6 may be initialized to the fifth power voltage VAINT.

The second capacitor Cap2 may include a first electrode E21 electrically connected to the third power line PL3, and a second electrode E22 electrically connected to the fourth node N4. The second capacitor Cap2 may be configured to maintain a voltage difference between the third power line PL3 and the fourth node N4.

The third capacitor Cap3 may include a first electrode E31 electrically connected to the fourth node N4, and a second electrode E32 electrically connected to the sixth node N6. The third capacitor Cap3 may be configured to maintain a difference in voltage between the fourth node N4 and the sixth node N6.

The light-emitting element LD may be electrically connected between the sixth node N6 and the fourth power line PL4. The light-emitting element LD may include a first electrode (e.g., an anode electrode) electrically connected to the sixth node N6, and a second electrode (e.g., a cathode electrode) electrically connected to the fourth power line PL4. In response to both the seventh transistor TR7 and the eighth transistor TR8 being turned on, current may flow through the light-emitting element LD from the third power line PL3 in a direction toward the fourth power line PL4.

Each of the first to tenth transistors TR1 to TR10 in accordance with some embodiments may be configured as transistors including a P-type semiconductor layer or an N-type semiconductor layer. Referring to FIG. 5, each of the first, fourth, fifth, seventh, eighth, and tenth transistors TR1, TR4, TR5, TR7, TR8, and TR10 may be configured as a transistor including a P-type semiconductor layer. Each of the second, third, sixth, and ninth transistors TR2, TR3, TR6, and TR9 may be configured as a transistor including an N-type semiconductor layer. However, embodiments are not limited to the foregoing example(s).

The transistor including the P-type semiconductor layer may include, for example, a silicon semiconductor (e.g., a polycrystalline silicon semiconductor). The transistor including the N-type semiconductor layer may include, for example, a metal-oxide semiconductor. However, embodiments are not limited to the foregoing example(s).

The metal-oxide semiconductor may include, for example, indium gallium zinc oxide (IGZO). However, embodiments are not limited to the aforementioned example(s).

With regard to the second power voltage VINT, voltages of different magnitudes may be applied to respective sub-pixels SP in a single pixel PXL. In this manner, a red sub-pixel (e.g., first sub-pixel SP1), a green sub-pixel (e.g., sub-pixel SP2), and a blue sub-pixel (e.g., sub-pixel SP3) may be controlled differently from each other in (or during) the width of the second emission control signal EM2.

As the red sub-pixel, the green sub-pixel, and the blue sub-pixel may be controlled differently from each other by the width of the second emission control signal EM2, the width of the second emission control signal EM2 may vary even for a same size (or voltage level) of the data voltage DATA_PWM. Consequently, the red sub-pixel, the green sub-pixel, and the blue sub-pixel may be controlled differently from each other during an emission time of the corresponding pixel PXL, thus achieving a similar effect to gamma correction with different gamma values for respective sub-pixels.

However, in the aforementioned embodiment(s), multiple second power lines PL2 may be arranged and may apply multiple second power voltages VINT of different magnitudes to the respective sub-pixels. Furthermore, the second power lines PL2 may be more efficiently arranged, as will become more apparent below.

Figure 6:
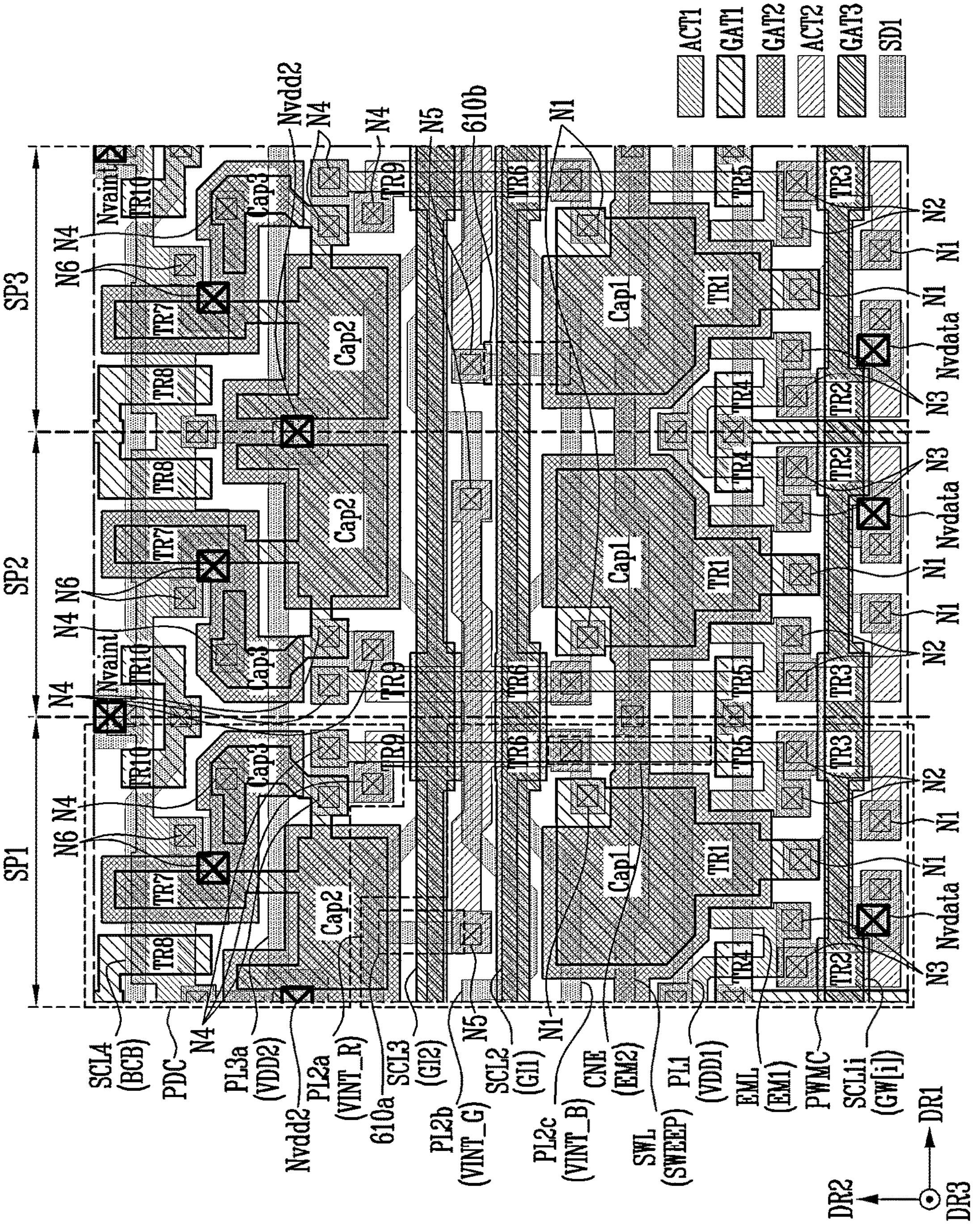
FIG. 6 schematically illustrates a first (e.g., lower) layout diagram of sub-pixels according to some embodiments.
Figure 7:
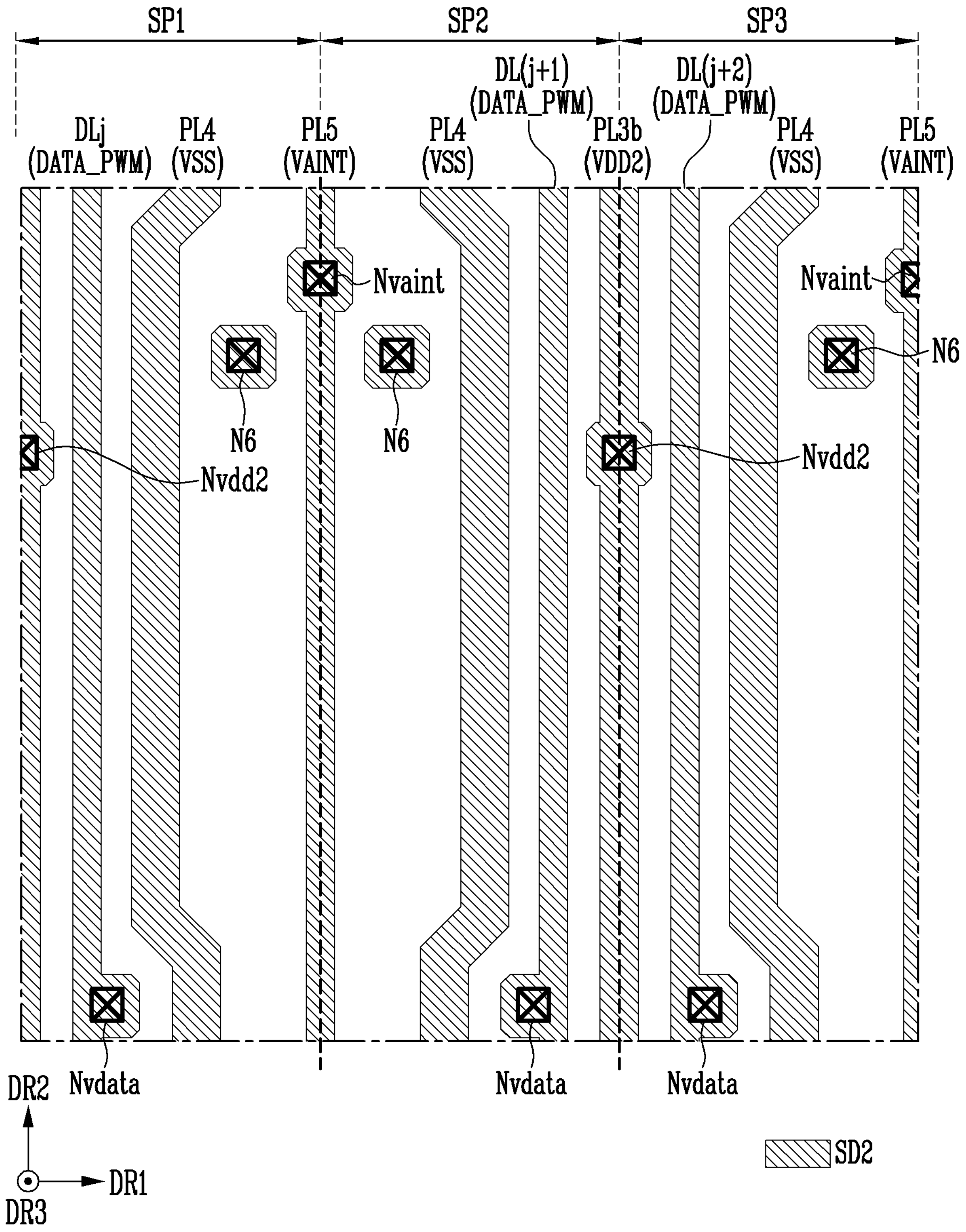
FIG. 7 schematically illustrates a second (e.g., upper) layout diagram of sub-pixels according to some embodiments.

FIG. 6 schematically illustrates a first (e.g., lower) layout diagram of the first, second, and third sub-pixels SP1, SP2, and SP3 according to some embodiments. FIG. 7 schematically illustrates a second (e.g., upper) layout diagram of the first, second, and third sub-pixels SP1, SP2, and SP3 according to some embodiments.

Referring to the layout diagrams of FIGS. 6 and 7, each of the first sub-pixel SP1, the second sub-pixel SP2, and the third sub-pixel SP3 may include the pulse width modulation circuit PWMC, the pixel driving circuit PDC, and the connection electrode CNE that are illustrated in the equivalent circuit diagram of FIG. 5.

Referring to FIG. 6, the pixel driving circuit PDC and the pulse width modulation circuit PWMC may be positioned adjacent to each other in the second direction DR2. The connection electrode CNE may extend in the second direction DR2 and electrically connect the pixel driving circuit PDC and the pulse width modulation circuit PWMC to each other.

The first sub-pixel SP1 may correspond to a red sub-pixel. The second sub-pixel SP2 may correspond to a green sub-pixel. The third sub-pixel SP3 may correspond to a blue sub-pixel. The first to third sub-pixels SP1 to SP3 may be adjacent to each other in the first direction DR1.

Referring to FIGS. 6 and 7, a first active pattern layer ACT1, a first gate electrode layer GAT1, a second gate electrode layer GAT2, a second active pattern layer ACT2, a third gate electrode layer GAT3, a first source-drain electrode layer SD1, and a second source-drain electrode layer SD2 may be stacked (e.g., sequentially stacked) on each other.

The first active pattern layer ACT1 may be formed of (or as) a silicon semiconductor (e.g., a polycrystalline silicon semiconductor). The first active pattern layer ACT1 may include a channel area. A source area and a drain area of the first active pattern layer ACT1 may be spaced apart from each other with the channel area disposed between the source area and the drain area.

The first gate electrode layer GAT1 may be positioned to overlap the channel area of the first active pattern ACT1, such as overlap the channel area of the first active pattern ACT1 in the third direction DR3. The first gate electrode layer GAT1 may include at least one metal material. For example, the first gate electrode layer GAT1 may be made of at least one of metals, such as gold (Au), silver (Ag), aluminum (Al), molybdenum (Mo), chromium (Cr), titanium (Ti), nickel (Ni), neodymium (Nd), copper (Cu), and tungsten (W), or an alloy of metals, such as an alloy of any one or more of the aforementioned metal materials. In an embodiment, the first gate electrode layer GAT1 may have a single-layer structure, or a multilayer structure formed by stacking layers made of two or more materials of metals and alloys on each other.

A first gate insulating layer (not illustrated) may be disposed between (e.g., stacked between in the third direction) the first gate electrode layer GAT1 and the first active pattern layer ACT1. The first gate insulating layer may include at least one inorganic insulating layer including at least one inorganic material. The first gate insulating layer may include an inorganic insulating material, such as at least one of silicon oxide ($SiO_2$), silicon nitride ($SiN_x$) (where x is a positive number), silicon oxynitride (SiON), aluminum oxide ($Al_2O_3$), titanium oxide ($TiO_2$), tantalum oxide ($Ta_2O_5$), hafnium oxide ($HfO_2$), and/or zinc oxide ($ZnO_x$). The zinc oxide may be zinc oxide (ZnO) and/or zinc peroxide ($ZnO_2$). Embodiments, however, are not limited to the aforementioned materials.

A second gate electrode layer GAT2 may be disposed on the first gate electrode layer GAT1. The first gate electrode layer GAT1 and the second gate electrode layer GAT2 may respectively form a first electrode and a second electrode of a capacitor. The second gate electrode layer GAT2 may include metal. For example, the second gate electrode layer GAT2 may be made of at least one of metals, such as at least one of gold (Au), silver (Ag), aluminum (Al), molybdenum (Mo), chromium (Cr), titanium (Ti), nickel (Ni), neodymium (Nd), copper (Cu), and tungsten (W), or an alloy of metals, such as at least one of the aforementioned metal materials. In an embodiment, the second gate electrode layer GAT2 may have a single-layer structure, or a multilayer structure formed by stacking layers made of two or more materials of metals and/or alloys on each other.

A second gate insulating layer (not illustrated) may be disposed between (e.g., stacked between in the third direction) the first gate electrode layer GAT1 and the second gate electrode layer GAT2. The second gate insulating layer may include at least one inorganic insulating layer including one or more inorganic materials. The second gate insulating layer may include an inorganic insulating material, such as at least one of silicon oxide ($SiO_2$), silicon nitride ($SiN_x$) (where x is a positive number), silicon oxynitride (SiON), aluminum oxide ($Al_2O_3$), titanium oxide ($TiO_2$), tantalum oxide ($Ta_2O_5$), hafnium oxide ($HfO_2$), and/or zinc oxide ($ZnO_x$). The zinc oxide may be zinc oxide (ZnO) and/or zinc peroxide ($ZnO_2$). Embodiments, however, are not limited to the aforementioned materials.

A first interlayer insulating layer (not illustrated) may be provided on the second gate electrode layer GAT2. The first interlayer insulating layer may be an inorganic insulating layer including at least one inorganic material. Polysiloxane, silicon nitride, silicon oxide, silicon oxynitride, and/or the like may be used as the at least one inorganic material. However, embodiments are not limited to the foregoing example(s).

A second active pattern layer ACT2 may be positioned on the first interlayer insulating layer. In an embodiment, the second active pattern layer ACT2 may be formed of (or as) an oxide semiconductor. The second active pattern layer ACT2 may include a metal oxide semiconductor. For example, the second active pattern layer ACT2 may include indium gallium zinc oxide (IGZO), but embodiments are not limited thereto. The second active pattern layer ACT2 may be doped with an N-type impurity. For example, phosphorus (P), arsenic (As), antimony (Sb), etc., may be used as the N-type impurity. For example, the second active pattern layer ACT2 may be formed by depositing a metal oxide using a sputtering method and etching (e.g., dry etching) the metal oxide. However, embodiments are not limited to the foregoing example. The second active pattern layer ACT2 may include a channel area. A source area and a drain area may be spaced apart from each other with the channel area disposed between the source area and the drain area.

The third gate electrode layer GAT3 may overlap the channel area of the second active pattern layer ACT2, such as overlap the channel area of the second active pattern layer ACT2 in the third direction. The third gate electrode layer GAT3 may include metal. For example, the third gate electrode layer GAT3 may be made of at least one of metals, such as at least one of gold (Au), silver (Ag), aluminum (Al), molybdenum (Mo), chromium (Cr), titanium (Ti), nickel (Ni), neodymium (Nd), copper (Cu), and tungsten (W), or an alloy of metals, e.g., an alloy including at least one of the aforementioned metal materials. In an embodiment, the third gate electrode layer GAT3 may have a single-layer structure, or a multilayer structure formed by stacking layers made of two or more materials of metals and/or alloys on each other.

A second interlayer insulating layer (not illustrated) may be provided on the third gate electrode layer GAT3. The second interlayer insulating layer may be an inorganic insulating layer including at least one inorganic material. Polysiloxane, silicon nitride, silicon oxide, silicon oxynitride, and/or the like may be used as the at least one inorganic material. However, embodiments are not limited to the foregoing example(s).

A first source-drain electrode layer SD1 may be provided on the second interlayer insulating layer. Source and drain electrodes of the first source-drain electrode layer SD1 may be electrically connected to the corresponding first active pattern layer ACT1 or second active pattern layer ACT2. For example, an electrode of the first source-drain electrode layer SD1 may be electrically connected to the source area of the first active pattern layer ACT1, or may be electrically connected to the drain area of the first active pattern layer ACT1. In some embodiments, an electrode of the first source-drain electrode layer SD1 may be electrically connected to the source area of the second active pattern layer ACT2, or may be electrically connected to the drain area of the second active pattern layer ACT2.

The first source-drain electrode layer SD1 may include metal. The first source-drain electrode layer SD1 may include a material having relatively excellent conductivity. For example, the first source-drain electrode layer SD1 may include a conductive material including, for instance, molybdenum (Mo), aluminum (Al), copper (Cu), titanium (Ti), and/or the like. The first source-drain electrode layer SD1 may have a single-layer structure or multilayer structure including at least one of the foregoing materials. For example, the first source-drain electrode layer SD1 may have a multilayer structure of Ti/Al/Ti.

A first via layer (not illustrated) may be provided on the first source-drain electrode layer SD1. For example, the first via layer may be formed of an organic insulating layer including at least one organic material, such as a general-purpose polymer, e.g., at least one of polymethylmethacrylate, polystyrene, polymer derivative including a phenolic group, an acrylic polymer, an imide-based polymer, aryl ether-based polymer, amide-based polymer, fluorinate polymer, p-xylene-based polymer, and vinyl alcohol-based polymer. The first via layer may function to planarize an area on the first source-drain electrode layer SD1.

A second source-drain electrode layer SD2 may be provided on the first via layer. A source or drain electrode of the second source-drain electrode layer SD2 may be electrically connected to the corresponding source or drain electrode of the first source-drain electrode layer SD1. For instance, the second source-drain electrode layer SD2 may be configured to electrically connect first source or drain electrodes of the first source-drain electrode layer SD1 that are spaced apart from each other, or to electrically connect a corresponding source or drain electrode of the first source/drain electrode layer SD1 to an electrode in another layer, such as an upper (or overlying) layer (e.g., an anode electrode or the like).

The second source-drain electrode layer SD2 may include metal. The second source-drain electrode layer SD2 may include a material having relatively excellent conductivity. For example, the second source-drain electrode layer SD2 may include at least one conductive material including, for instance, at least one of molybdenum (Mo), aluminum (Al), copper (Cu), titanium (Ti), and/or the like. The second source-drain electrode layer SD2 may have a single-layer structure or multilayer structure including at least one of the foregoing materials. For example, the second source-drain electrode layer SD2 may have a multilayer structure of Ti/Al/Ti.

A second via layer (not illustrated) may be provided on the second source-drain electrode layer SD2. For example, the second via layer may be formed of an organic insulating layer including one or more organic materials. The second via layer may include an organic insulating material, e.g., a general-purpose polymer, such as at least one of polymethylmethacrylate, polystyrene, polymer derivative including a phenolic group, an acrylic polymer, an imide-based polymer, aryl ether-based polymer, amide-based polymer, fluorinate polymer, p-xylene-based polymer, and vinyl alcohol-based polymer. The second via layer may function to planarize an area on the second source-drain electrode layer SD2.

The semiconductor layer of each of the first, fourth, fifth, seventh, eighth, and tenth transistors TR1, TR4, TR5, TR7, TR8, and TR10 may be formed of respective portions of the first active pattern layer ACT1. The gate electrode of each of the first, fourth, fifth, seventh, eighth, and tenth transistors TR1, TR4, TR5, TR7, TR8, and TR10 may be formed of respective portions of the first gate electrode layer GAT1.

The semiconductor layer of each of the second, third, sixth, and ninth transistors TR2, TR3, TR6, and TR9 may be formed of respective portions of the second active pattern layer ACT2. The gate electrode of each of the second, third, sixth, and ninth transistors TR2, TR3, TR6, and TR9 may be formed of respective portions of the third gate electrode layer GAT3. The first capacitor Cap1 may be configured of respective portions of the first gate electrode layer GAT1 and the second gate electrode layer GAT2 that overlap and face each other in, for instance, the third direction DR3. Referring further to FIG. 5, the first capacitor Cap1 may include a first electrode E11 configured of a portion of the first gate electrode layer GAT1, and a second electrode E12 configured of a portion of the second gate electrode layer GAT2.

The second capacitor Cap2 may be configured of respective portions of the first gate electrode layer GAT1 and the second gate electrode layer GAT2 that overlap and face each other in, for instance, the third direction DR3. Referring further to FIG. 5, the second capacitor Cap2 may include a first electrode E21 configured of a portion of the second gate electrode layer GAT2, and a second electrode E22 configured of a portion of the first gate electrode layer GAT1.

The third capacitor Cap3 may be configured of respective portions of the first gate electrode layer GAT1 and the second gate electrode layer GAT2 that overlap and face each other in, for instance, the third direction DR3. Referring further to FIG. 5, the third capacitor Cap3 may include a first electrode E31 configured of a portion of the first gate electrode layer GAT1, and a second electrode E32 configured of a portion of the second gate electrode layer GAT2.

The first transistor TR1 may include a semiconductor layer configured of a portion of the first active pattern layer ACT1. The first transistor TR1 may include a gate electrode configured of a portion of the first gate electrode layer GAT1. The first active pattern layer ACT1 of the first transistor TR1 may include a channel area overlapping the first gate electrode layer GAT1 in, for instance, the third direction DR3. The first active pattern layer ACT1 of the first transistor TR1 may include a source area and a drain area spaced apart from each other with a channel area disposed between the source area and the drain area. Respective portions of the first active pattern layer ACT1 of the first transistor TR1 may be electrically connected to corresponding portions of the first source-drain electrode layer SD1 in association with the second node N2 and the third node N3.

The second transistor TR2 may include a semiconductor layer configured of a portion of the second active pattern layer ACT2. The second transistor TR2 may include a gate electrode configured of a portion of the third gate electrode layer GAT3. The second active pattern layer ACT2 of the second transistor TR2 may include a channel area overlapping the third gate electrode layer GAT3 in, for instance, the third direction DR3. The second active pattern layer ACT2 of the second transistor TR2 may include a source area and a drain area spaced apart from each other with a channel area disposed between the source area and the drain area. Respective portions of the second active pattern layer ACT2 of the second transistor TR2 may be electrically connected to corresponding portions of the first source-drain electrode layer SD1 in association with a data voltage supply node Nvdata and the third node N3.

The third transistor TR3 may include a semiconductor layer configured of a portion of the second active pattern layer ACT2. The third transistor TR3 may include a gate electrode configured of a portion of the third gate electrode layer GAT3. The second active pattern layer ACT2 of the third transistor TR3 may include a channel area overlapping the third gate electrode layer GAT3 in, for instance, the third direction DR3. The second active pattern layer ACT2 of the third transistor TR3 may include a source area and a drain area spaced apart from each other with a channel area disposed between the source area and the drain area. Respective portions of the second active pattern layer ACT2 of the third transistor TR3 may be electrically connected to corresponding portions of the first source-drain electrode layer SD1 in association with the first node N1 and the second node N2.

The fourth transistor TR4 may include a semiconductor layer configured of a portion of the first active pattern layer ACT1. The fourth transistor TR4 may include a gate electrode configured of a portion of the first gate electrode layer GAT1. The first active pattern layer ACT1 of the fourth transistor TR4 may include a channel area overlapping the first gate electrode layer GAT1 in, for instance, the third direction DR3. The first active pattern layer ACT1 of the fourth transistor TR4 may include a source area and a drain area spaced apart from each other with a channel area disposed between the source area and the drain area. A first portion of the first active pattern layer ACT1 of the fourth transistor TR4 may be electrically connected to a corresponding portion of the first source-drain electrode layer SD1 in association with the third node N3. A second portion of the first active pattern layer ACT1 of the fourth transistor TR4 may be electrically connected to the first power line PL1, which may be configured as a portion of the first source-drain electrode layer SD1.

The fifth transistor TR5 may include a semiconductor layer configured of a portion of the first active pattern layer ACT1. The fifth transistor TR5 may include a gate electrode configured of a portion of the first gate electrode layer GAT1. The first active pattern layer ACT1 of the fifth transistor TR5 may include a channel area overlapping the first gate electrode layer GAT1 in, for instance, the third direction DR3. The first active pattern layer ACT1 of the fifth transistor TR5 may include a source area and a drain area spaced apart from each other with a channel area disposed between the source area and the drain area. Respective portions of the first active pattern layer ACT1 of the fifth transistor TR5 may be electrically connected to corresponding portions of the first source-drain electrode layer SD1 in association with the second node N2 and the fourth node N4.

The sixth transistor TR6 may include a semiconductor layer configured of a portion of the second active pattern layer ACT2. The sixth transistor TR6 may include a gate electrode configured of a portion of the third gate electrode layer GAT3. The second active pattern layer ACT2 of the sixth transistor TR6 may include a channel area overlapping the third gate electrode layer GAT3 in, for example, the third direction DR3. The second active pattern layer ACT2 of the sixth transistor TR6 may include a source area and a drain area spaced apart from each other with a channel area disposed between the source area and the drain area. Respective portions of the second active pattern layer ACT2 of the sixth transistor TR6 may be electrically connected to corresponding portions of the first source-drain electrode layer SD1 in association with the first node N1 and the fifth node N5.

The seventh transistor TR7 may include a semiconductor layer configured of a portion of the first active pattern layer ACT1. The seventh transistor TR7 may include a gate electrode configured of a portion of the first gate electrode layer GAT1. The first active pattern layer ACT1 of the seventh transistor TR7 may include a channel area overlapping the first gate electrode layer GAT1 in, for instance, the third direction DR3. The first active pattern layer ACT1 of the seventh transistor TR7 may include a source area and a drain area spaced apart from each other with a channel area disposed between the source area and the drain area. A first portion of the first active pattern layer ACT1 of the seventh transistor TR7 may be electrically connected to a corresponding portion of the first source-drain electrode layer SD1 in association with the sixth node N6. A second portion of the first active pattern layer ACT1 of the seventh transistor TR7 may extend from a corresponding portion of the first active pattern layer ACT1 formed in association with the eighth transistor TR8. However, in an embodiment, the second portion of the first active pattern layer ACT1 of the seventh transistor TR7 may be electrically connected to a corresponding portion of the first active pattern layer ACT1 of the eighth transistor TR8 through another portion of the first source-drain electrode layer SD1.

The eighth transistor TR8 may include a semiconductor layer configured of a portion of the first active pattern layer ACT1. The eighth transistor TR8 may include a gate electrode configured of a portion of the first gate electrode layer GAT1. The first active pattern layer ACT1 of the eighth transistor TR8 may include a channel area overlapping the first gate electrode layer GAT1 in, for example, the third direction DR3. The first active pattern layer ACT1 of the eighth transistor TR8 may include a source area and a drain area spaced apart from each other with a channel area disposed between the source area and the drain area. A first portion of the first active pattern layer ACT1 of the eighth transistor TR8 may be electrically connected to a corresponding portion of the first source-drain electrode layer SD1 in association with a power voltage supply node Nvdd2. A first portion of the first active pattern layer ACT1 of the eighth transistor TR8 may extend from a corresponding portion of the first active pattern layer ACT1 of the seventh transistor TR7. However, in an embodiment, the first portion of the first active pattern layer ACT1 of the eighth transistor TR8 may be electrically connected to the corresponding portion of the first active pattern layer ACT1 of the seventh transistor TR7 through another portion of the first source-drain electrode layer SD1.

The ninth transistor TR9 may include a semiconductor layer configured of a portion of the second active pattern layer ACT2. The ninth transistor TR9 may include a gate electrode configured of a portion of the third gate electrode layer GAT3. The second active pattern layer ACT2 of the ninth transistor TR9 may include a channel area overlapping the third gate electrode layer GAT3 in, for instance, the third direction DR3. The second active pattern layer ACT2 of the ninth transistor TR9 may include a source area and a drain area spaced apart from each other with a channel area disposed between the source area and the drain area. Respective portions of the second active pattern layer ACT2 of the ninth transistor TR9 may be electrically connected to corresponding portions of the first source-drain electrode layer SD1 in association with the fourth node N4 and the second node N5.

The tenth transistor TR10 may include a semiconductor layer configured of a portion of the first active pattern layer ACT1. The tenth transistor TR10 may include a gate electrode configured of a portion of the first gate electrode layer GAT1. The first active pattern layer ACT1 of the tenth transistor TR10 may include a channel area overlapping the first gate electrode layer GAT1 in, for instance, the third direction DR3. The first active pattern layer ACT1 of the tenth transistor TR10 may include a source area and a drain area spaced apart from each other with a channel area disposed between the source area and the drain area. Respective portions of the first active pattern layer ACT1 of the tenth transistor TR10 may be electrically connected to corresponding portions of the first source-drain electrode layer SD1 in association with the sixth node N6 and an anode initialization voltage supply node Nvaint.

Each of the first gate line SCL1*i*, the second gate line SCL2, and the third gate line SCL3 may include a portion of the third gate electrode layer GAT3. The first gate line SCL1*i*, the second gate line SCL2, and the third gate line SCL3 may extend generally in the first direction DR1.

Each of the fourth gate line SCL4, the emission control line EML, the first power line PL1, and the sweep line SWL may include a portion of the first source-drain electrode layer SD1.

A second power voltage VINT_R to be supplied to the first sub-pixel SP1 (e.g., a red sub-pixel) may be applied to a 2a-th power line PL2*a*. A second power voltage VINT_G to be supplied to the second sub-pixel SP2 (e.g., a green sub-pixel) may be applied to a 2b-th power line PL2*b*. A second power voltage VINT_B to be supplied to the third sub-pixel SP3 (e.g., a blue sub-pixel) may be applied to a 2c-th power line PL2*c*.

Each of the 2a-th, 2b-th, and 2c-th power lines PL2*a*, PL2*b*, and PL2*c* may include a portion of the third gate electrode layer GAT3. Each of the 2a-th, 2b-th, and 2c-th power lines PL2*a*, PL2*b*, and PL2*c* may extend generally in the first direction DR1.

The 2a-th power line PL2*a* may include a first bridge pattern 610*a*. The first bridge pattern 610*a* may branch from the 2a-th power line PL2*a* and extend generally in the second direction DR2. Referring to FIG. 6, the first bridge pattern 610*a* may be positioned to overlap the third gate line SCL3 in, for instance, the third direction DR3. The first bridge pattern 610*a* may be electrically connected to the fifth node N5 of the first sub-pixel SP1.

The 2c-th power line PL2*c* may include a second bridge pattern 610*b*. The second bridge pattern 610*b* may branch from the 2c-th power line PL2*c* and extend generally in the second direction DR2. Referring to FIG. 6, the second bridge pattern 610*b* may be positioned to overlap the second gate line SCL2 in, for instance, the third direction DR3. The second bridge pattern 610*b* may be electrically connected to the fifth node N5 of the third sub-pixel SP3.

The 2b-th power line PL2*b* may bend around the first bridge pattern 610*a* in a view in the third direction DR3, and extend generally in the first direction DR1 while bypassing the first bridge pattern 610*a*. The 2b-th power line PL2*b* may bend around the second bridge pattern 610*b* in the view in the third direction DR3, and extend generally in the first direction DR1 while bypassing the second bridge pattern 610*b*. The 2b-th bridge line PL2*b* may be electrically connected to the fifth node N5 of the second sub-pixel SP2.

Referring to FIGS. 6 and 7, a 3a-th power line PL3*a* may be configured of a portion of the first source-drain electrode layer SD1 and extend generally in the first direction DR1. A 3b-th power line PL3*b* may be configured of a portion of the second source-drain electrode layer SD2 and extend generally in the second direction DR2. The 3a-th power line PL3*a* and the 3b-th power line PL3*b* may be electrically connected to a power voltage supply node Nvdd2. A third power voltage VDD2 may be applied in common to the 3a-th power line PL3*a* and the 3b-th power line PL3*b*.

Referring to FIG. 7, data lines DLj, DL(j+1), and DL(j+2) may each include respective portions of the second source-drain electrode layer SD2. The data lines DLj, DL(j+1), and DL(j+2) may extend generally in the second direction DR2. Each of the data lines DLj, DL(j+1), and DL(j+2) may be supplied with a data voltage DATA_PWM to be applied to a sub-pixel electrically connected to the corresponding data line.

The j-th data line DLj may extend generally in the second direction DR2, and may be electrically connected to the second transistor TR2 of the first sub-pixel SP1 via the data voltage supply node Nvdata. A (j+1)-th data line DL(j+1) may extend generally in the second direction DR2, and may be electrically connected to the second transistor TR2 of the second sub-pixel SP2 via the data voltage supply node Nvdata. A (j+2)-th data line DL(j+2) may extend generally in the second direction DR2, and may be electrically connected to the second transistor TR2 of the third sub-pixel SP3 via the data voltage supply node Nvdata.

The fourth power line PL4 may be configured of a portion of the second source-drain electrode layer SD2 and extend generally in the second direction DR2. A fourth power voltage VSS may be applied to the fourth power line PL4. The fourth power line PL4 may be electrically connected to a (e.g., one) electrode of the light-emitting element LD (e.g., a cathode electrode) that may form a portion of the second source-drain electrode layer SD2.

The fifth power line PL5 may be configured of a portion of the second source-drain electrode layer SD2 and extend generally in the second direction DR2. A fifth power voltage VAINT may be applied to the fifth power line PL5. The fifth power line PL5 may be electrically connected to the tenth transistor TR10 via the anode initialization voltage supply node Nvaint.

In an embodiment, a (e.g., one) fifth power line PL5 may be electrically connected in common to the tenth transistors TR10 of different sub-pixels positioned adjacent to each other, such as adjacent to each other in the first direction DR1. For example, referring to FIGS. 6 and 7, a same fifth power line PL5 may be electrically connected in common to the tenth transistor TR10 of the first sub-pixel SP1 and the tenth transistor TR10 of the second sub-pixel SP2 via the anode initialization voltage supply node Nvaint. However, embodiments are not limited to the aforementioned example(s), and the first to third sub-pixels SP1 to SP3 may be respectively electrically connected to different fifth power lines PL5.

A portion of the second source-drain electrode layer SD2 forming the sixth node N6 may be positioned between the fourth power line PL4 and the fifth power line PL5 in, for example, the first direction DR1. Referring further to FIG. 5, a portion of the second source-drain electrode layer SD2 forming the sixth node N6 may be electrically connected to a (e.g., one) electrode of the light-emitting element LD (e.g., the anode electrode) that may form a portion of the second source-drain electrode layer SD2.

In accordance with some embodiments, the 2a-th power line PL2*a*, the 2b-th power line PL2*b*, and the 2c-th power line PL2*c* may be configured of portions of the first source-drain electrode layer SD1, thus reducing resistance of lines configured from portions of the second source-drain electrode layer SD2. Furthermore, since the first, second, and third sub-pixels SP1, SP2, and SP3 are respectively electrically connected to the 2a-th power line PL2*a*, the 2b-th power line PL2*b*, and the 2c-th power line PL2*c*, an effect similar to correcting the respective sub-pixels with different gamma values may be acquired or realized. Consequently, the display quality may be improved.

Figure 8A:
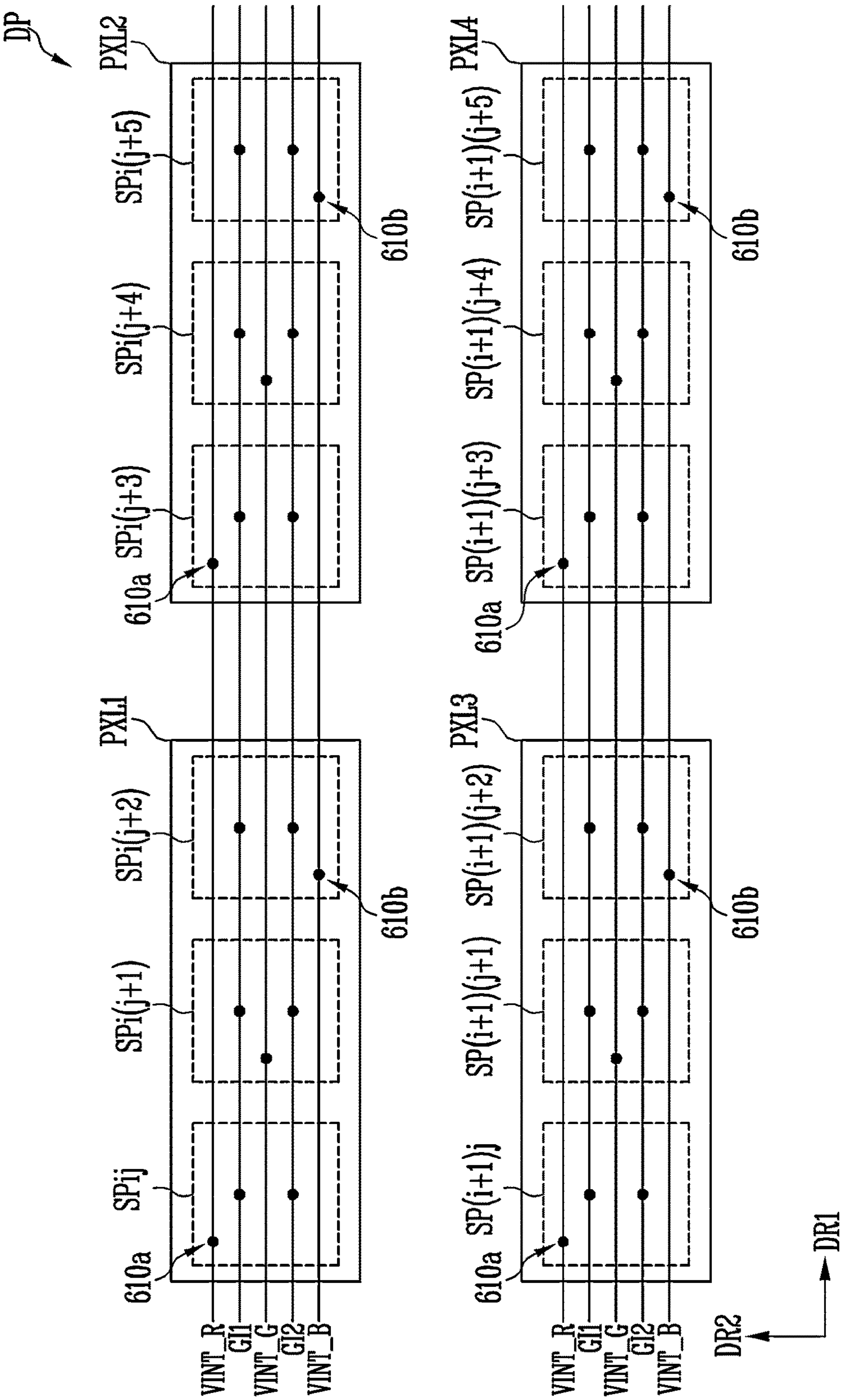
FIG. 8A schematically illustrates bridge patterns of the display panel of FIG. 2 according to some embodiments.

FIG. 8A schematically illustrates the first and second bridge patterns 610*a* and 610*b* of the display panel DP of FIG. 2 according to some embodiments.

Referring to FIG. 8A, there are illustrated a first pixel PXL1, a second pixel PXL2, a third pixel PXL3, and a fourth pixel PXL4. The first pixel PXL1 and the second pixel PXL2 may be adjacent to each other in the first direction DR1. The third pixel PXL3 and the fourth pixel PXL4 may be adjacent to each other in the first direction DR1. The first pixel PXL1 and the third pixel PXL3 may be adjacent to each other in the second direction DR2. The second pixel PXL2 and the fourth pixel PXL4 may be adjacent to each other in the second direction DR2.

The first pixel PXL1 may include an ij-th sub-pixel SPij, an i(j+1)-th sub-pixel SPi(j+1), and an i(j+2)-th sub-pixel SPi(j+2). The ij-th sub-pixel SPij, the i(j+1)-th sub-pixel SPi(j+1), and the i(j+2)-th sub-pixel SPi(j+2) may be adjacent to each other in the first direction DR1.

The second pixel PXL2 may include an i(j+3)-th sub-pixel SPi(j+3), an i(j+4) sub-pixel SPi(j+4), and an i(j+5)-th sub-pixel SPi(j+5). The i(j+3)-th sub-pixel SPi(j+3), the i(j+4) sub-pixel SPi(j+4), and the i(j+5)-th sub-pixel SPi(j+5) may be adjacent to each other in the first direction DR1.

The third pixel PXL3 may include an (i+1) j-th sub-pixel SP(i+1)j, an (i+1)(j+1)-th sub-pixel SP(i+1)(j+1), and an (i+1)(j+2)-th sub-pixel SP(i+1)(j+2). The (i+1)j-th sub-pixel SP(i+1)j, the (i+1)(j+1)-th sub-pixel SP(i+1)(j+1), and the (i+1)(j+2)-th sub-pixel SP(i+1)(j+2) may be adjacent to each other in the first direction DR1.

The fourth pixel PXL4 may include an (i+1)(j+3)-th sub-pixel SP(i+1)(j+3), an (i+1)(j+4)-th sub-pixel SP(i+1)(j+4), and an (i+1)(j+5)-th sub-pixel SP(i+1)(j+5). The (i+1)(j+3)-th sub-pixel SP(i+1)(j+3), the (i+1)(j+4)-th sub-pixel SP(i+1)(j+4), and an (i+1)(j+5)-th sub-pixel SP(i+1)(j+5) may be adjacent to each other in the first direction DR1.

In the first pixel PXL1, the ij-th sub-pixel SPij may be supplied, through the first bridge pattern 610*a*, with a second power voltage VINT_R to be applied to the red sub-pixel. The i(j+1)-th sub-pixel SPi(j+1) may be supplied with a second power voltage VINT_G to be applied to the green sub-pixel, without a bridge pattern. The i(j+2)-th sub-pixel SPi(j+2) may be supplied, through the second bridge pattern 610*b*, with a second power voltage VINT_B to be applied to the blue sub-pixel.

Referring to FIG. 8A, the ij-th sub-pixel SPij positioned at a leftmost side in the first pixel PXL1 may be supplied with a second power voltage (e.g., the second power voltage VINT_R to be supplied to the red sub-pixel) through the first bridge pattern 610*a*. The i(j+1)-th sub-pixel SPi(j+1) positioned at an intermediate portion in the first pixel PXL1 may be supplied (e.g., directly supplied) with a second power voltage (e.g., the second power voltage VINT_G to be supplied to the green sub-pixel) without a bridge pattern. The i(j+2)-th sub-pixel SPi(j+2) positioned at a rightmost side in the first pixel PXL1 may be supplied with a second power voltage (e.g., the second power voltage VINT_B to be supplied with the blue sub-pixel) through the second bridge pattern 610*b*.

The second pixel PXL2, the third pixel PXL3, and the fourth pixel PXL4 may also be supplied with a corresponding second power voltage VINT in a same manner as the first pixel PXL1.

Figure 8B:
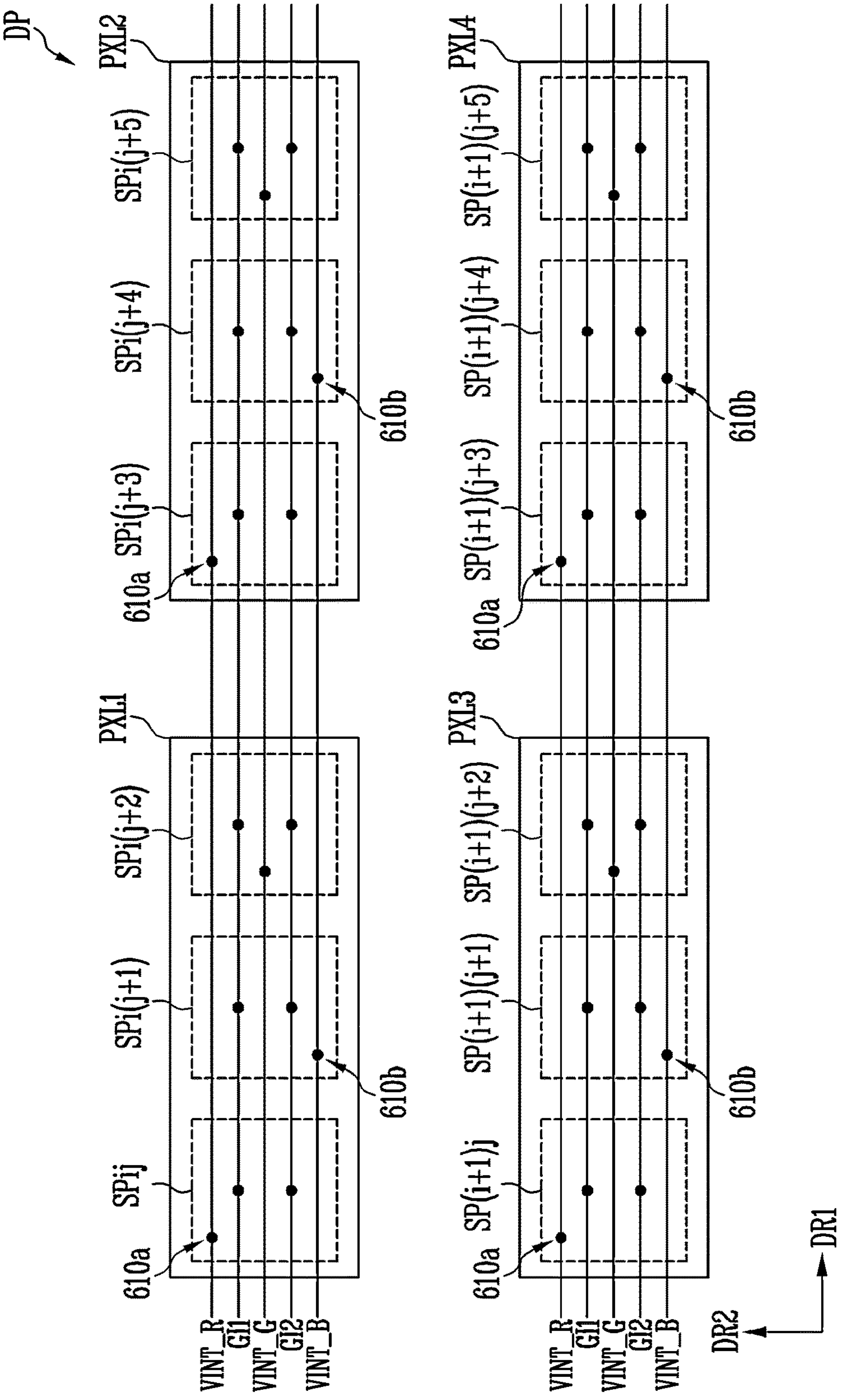
FIG. 8B schematically illustrates bridge patterns of the display panel of FIG. 2 according to some embodiments.

FIG. 8B schematically illustrates the first and second bridge patterns 610*a* and 610*b* of the display panel DP of FIG. 2 according to some embodiments.

The descriptions of each of the first to fourth pixels PXL1 to PXL4 and the descriptions of the sub-pixels included in the first to fourth pixels PXL1 to PXL4 are the same as described in association with FIG. 8A. Therefore, redundant descriptions will be omitted.

In the first pixel PXL1, the ij-th sub-pixel SPij may be supplied, through the first bridge pattern 610*a*, with a second power voltage VINT_R to be applied to the red sub-pixel. The i(j+1)-th sub-pixel SPi(j+1) may be supplied, through the second bridge pattern 610*b*, with a second power voltage VINT_B to be applied to the blue sub-pixel. The i(j+2)-th sub-pixel SPi(j+2) may be supplied with a second power voltage VINT_G to be applied to the green sub-pixel, without a bridge pattern.

In some embodiments, the ij-th sub-pixel SPij positioned at a leftmost side in the first pixel PXL1 may be supplied with a second power voltage (e.g., the second power voltage VINT_R to be supplied to the red sub-pixel) through the first bridge pattern 610*a*. The i(j+1)-th sub-pixel SPi(j+1) positioned at an intermediate portion in the first pixel PXL1 may be supplied with a second power voltage (e.g., the second power voltage VINT_B to be supplied to the blue sub-pixel) through the second bridge pattern 610*b*. The i(j+2)-th sub-pixel SPi(j+2) positioned at a rightmost side in the first pixel PXL1 may be supplied with a second power voltage (e.g., the second power voltage VINT_G to be supplied with the green sub-pixel) without a bridge pattern.

The second pixel PXL2, the third pixel PXL3, and the fourth pixel PXL4 may also be supplied with a corresponding second power voltage VINT in a same manner as the first pixel PXL1.

Each of the bridge patterns illustrated in FIGS. 8A and 8B is merely an example, and embodiments are not limited to the above description.

Figure 9:
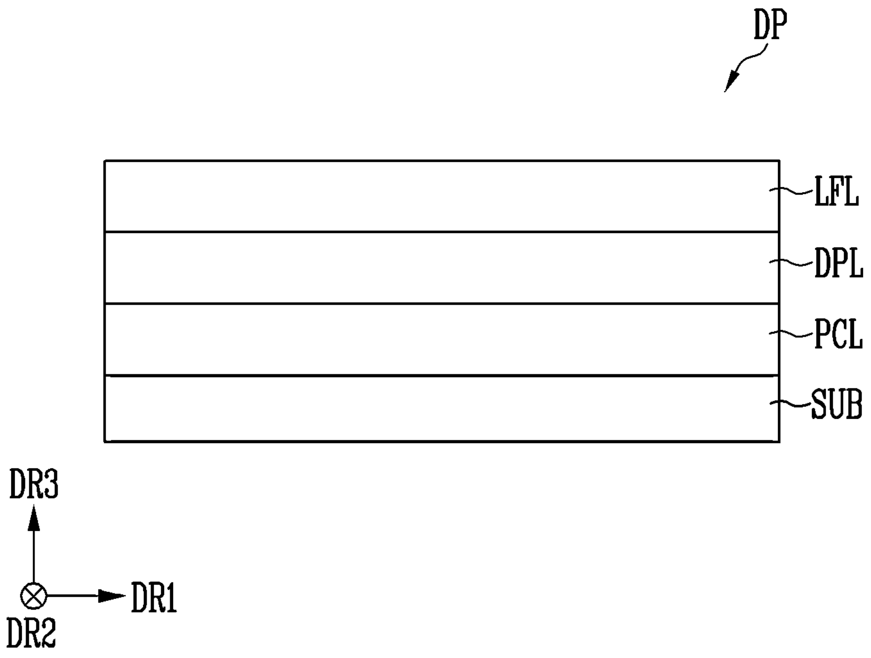
FIG. 9 schematically illustrates a sectional view of the display panel of FIG. 2 according to some embodiments.

FIG. 9 schematically illustrates a sectional view of the display panel DP of FIG. 2 according to some embodiments.

Referring to FIG. 9, the display panel DP may not only include a substrate SUB, but also include a pixel circuit layer PCL, a display element layer DPL, and a light functional layer LFL sequentially disposed (e.g., stacked) on the substrate SUB in the third direction DR3.

The substrate SUB may be made of at least one insulating material, such as glass and/or resin. For example, the substrate SUB may include a glass substrate. In some implementations, the substrate SUB may include a polyimide (polyimide) substrate. According to some embodiments, the substrate SUB may include a silicon wafer substrate formed through a semiconductor process.

In some embodiments, the substrate SUB may be formed of a material having flexibility to allow the substrate SUB to be bent, folded, twisted, flexed, and/or the like. In some embodiments, the substrate SUB may have a single-layer or multi-layer structure. For instance, examples of the material having flexibility may include at least one of the following: polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. In some implementations, at least one layer among the layers of a multi-layer structure forming the substrate SUB may be formed of a different material than at least one other layer among the layers of the multi-layer structure. However, embodiments are not limited to the foregoing example(s).

The pixel circuit layer PCL may be disposed on the substrate SUB, e.g., disposed on an upper surface of the substrate SUB. The pixel circuit layer PCL may include insulating layers, and active patterns and conductive patterns disposed between at least two of the insulating layers. The conductive patterns of the pixel circuit layer PCL may function as circuit elements, lines, and/or the like. The conductive patterns may correspond to the first to third gate electrode layers GAT1 to GAT3 and the first and second source-drain electrode layers SD1 and SD2 previously described with reference to FIGS. 6 and 7.

The circuit elements of the pixel circuit layer PCL may include the respective sub-pixel circuits (SPC; refer to FIG. 3) of the sub-pixels SP described in association with FIG. 2. For example, the circuit elements of the pixel circuit layer PCL may include the first to tenth transistors TR1 to TR10 and the first to third capacitors Cap1 to Cap3 described in association with FIG. 5. As described with reference to FIGS. 6 and 7, the first and second active pattern layers ACT1 and ACT2, the first to third gate electrode layers GAT1 to GAT3, and the first and second source-drain electrode layers SD1 and SD2 may constitute the circuit elements of the pixel circuit layer PCL.

The lines of the pixel circuit layer PCL may include lines electrically connected to the sub-pixels SP described in association with FIG. 2. The lines of the pixel circuit layer PCL may include the first to fifth power lines PL1 to PL5, the first to fourth gate lines SCL1*i*, SCL2, SCL3, and SCL4, the data line DLj, and the sweep line SWL described in association with FIG. 5.

The display element layer DPL may be disposed on the pixel circuit layer PCL. The display element layer DPL may include the respective light-emitting elements of the sub-pixels SP.

The light functional layer LFL may be disposed on the display element layer DPL. The light functional layer LFL may include light conversion patterns having color conversion particles and/or scattering particles. For example, the color conversion particles may include quantum dots, quantum rods, and/or the like. For convenience, it will be assumed that the color conversion particles are quantum dots. The quantum dots may convert the wavelength (or color) of light emitted from the display element layer DPL. The light functional layer LFL may further include light scattering patterns having scattering particles. In some embodiments, the light conversion patterns and the light scattering patterns may be omitted.

The light functional layer LFL may further include a color filter layer including color filters. Each of the color filters may selectively transmit light of a specific wavelength band (or specific color). In some embodiments, the color filter layer may be omitted.

A window may be provided on the light functional layer LFL to protect an exposed surface (or upper surface) of the display panel DP. The window may be configured to protect the display panel DP from external impact. The window may extend from (e.g., may be structurally connected to) the light functional layer LFL by an optically transparent adhesive (or bonding) agent. The window may have a multilayer structure selected from among a glass substrate, a plastic film, and/or a plastic substrate. The multilayer structure may be formed through successive processes or an adhesion process using an adhesive layer to couple adjacent layers together. The entirety or a portion of the window may have flexibility. It is also contemplated that the window may have a single layer structure.

Figure 10:
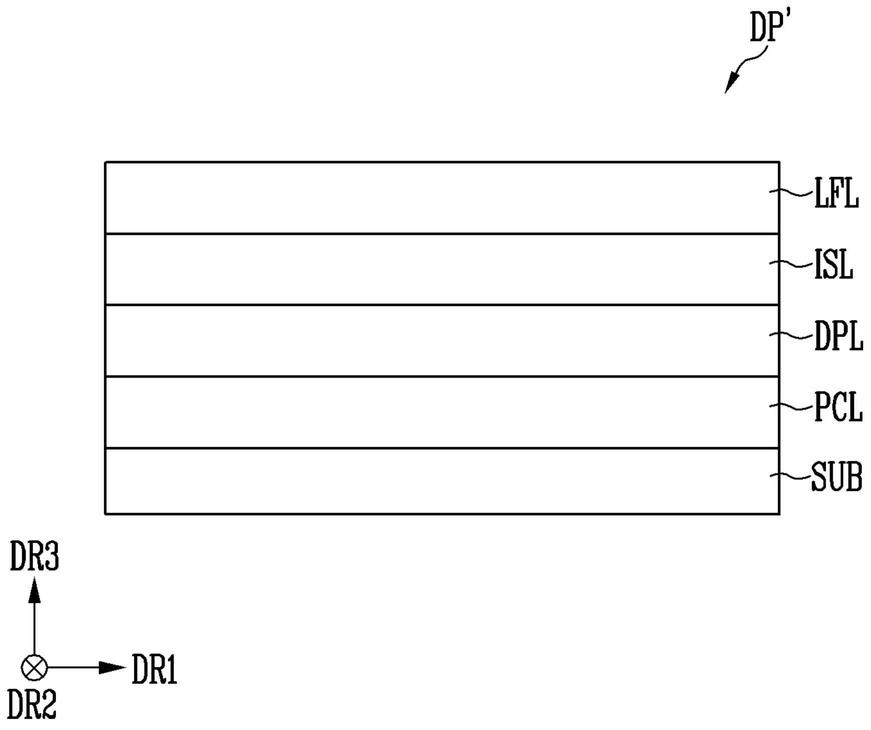
FIG. 10 schematically illustrates a sectional view of the display panel of FIG. 2 according to some embodiments.

FIG. 10 schematically illustrates a sectional view of a display panel DP' of FIG. 2 according to some embodiments.

Referring to FIG. 10, the display panel DP' may include a substrate SUB, a pixel circuit layer PCL, a display element layer DPL, an input sensing layer ISL, and a light functional layer LFL sequentially disposed on one another in the third direction DR3. The substrate SUB, the pixel circuit layer PCL, the display element layer DPL, and the light functional layer LFL may be configured in a same manner as the substrate SUB, the pixel circuit layer PCL, the display element layer DPL, and the light functional layer LFL that have been described with reference to FIG. 9. Hereinafter, repetitive explanations will be omitted.

The input sensing layer ISL may sense a user input on, adjacent to, and/or approaching an upper surface (or display surface) of the display panel DP'. The input sensing layer ISL may include components suitable for sensing an external object, such as the hand of a user, a pen, and/or the like. For example, the input sensing layer ISL may include touch electrodes.

Figure 11:
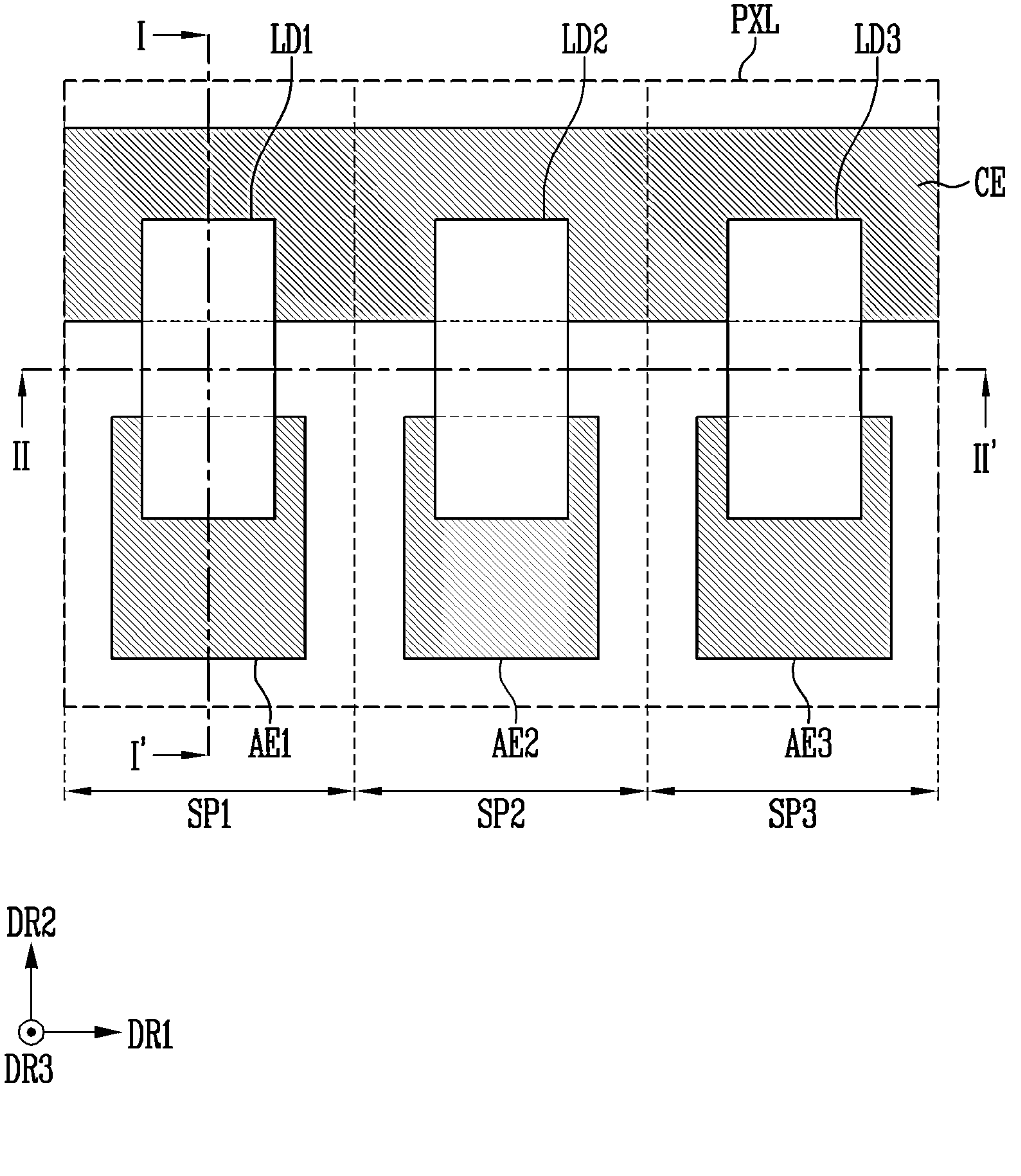
FIG. 11 schematically illustrates an orthographic view of any one pixel of the display panel of FIG. 2 according to some embodiments.

FIG. 11 schematically illustrates an orthographic view of any one pixel PXL of the display panel of FIG. 2 according to some embodiments.

Referring to FIG. 11, the pixel PXL may include first to third sub-pixels SP1 to SP3. The first and third sub-pixels SP1 to SP3 may be arranged in the first direction DR1. However, the arrangement of the pixel PXL is not limited thereto. For instance, the arrangement of the pixel PXL may be changed in various ways depending on the desired configuration for display panel DP. For example, the first to third sub-pixels SP1 to SP3 may be arranged in a zigzag pattern, a PenTile™ pattern, or the like.

First to third anode electrodes AE1 to AE3 may be respectively disposed in the first to third sub-pixels SP1 to SP3. The first anode electrode AE1 may be provided as an electrode electrically connected to the sub-pixel circuit SPC (see, e.g., FIG. 3) of the first sub-pixel SP1. The second anode electrode AE2 may be provided as an electrode electrically connected to the sub-pixel circuit SPC of the second sub-pixel SP2. The third anode electrode AE3 may be provided as an electrode electrically connected to the sub-pixel circuit SPC of the third sub-pixel SP3.

The cathode electrode CE may be spaced apart from the first to third anode electrodes AE1 to AE3. The cathode electrode CE may be disposed at a same height as the first to third anode electrodes AE1 to AE3 from, for instance, an underlying substrate, e.g., substrate SUB described in association with FIG. 9 or 10. The cathode electrode CE may be spaced apart from the first to third anode electrodes AE1 to AE3 in the second direction DR2. In some embodiments, the cathode electrode CE may extend in the first direction DR1, and may be used as a common electrode for the pixel PXL and one or more other pixels adjacent to the pixel PXL. Although not illustrated, in some embodiments, the cathode electrode CE may extend not only in the first direction DR1, but also in the second direction DR2, and may be used as a common electrode for all (or some portion of) of the sub-pixels SP described in association with FIG. 2 that are adjacent to one another in the first and second directions DR1 and DR2. As such, the cathode electrode CE may have various shapes.

The first to third light-emitting elements LD1 to LD3 may be disposed on the first to third anode electrodes AE1 to AE3 and the cathode electrode CE. The first light-emitting element LD1 may be electrically connected to the first anode electrode AE1 and the cathode electrode CE. The first light-emitting element LD1 may be provided as a light-emitting element LD electrically connected to the sub-pixel circuit SPC of the first sub-pixel SP1. The second light-emitting element LD2 may be electrically connected to the second anode electrode AE2 and the cathode electrode CE. The second light-emitting element LD2 may be provided as a light-emitting element LD electrically connected to the sub-pixel circuit SPC of the second sub-pixel SP2. The third light-emitting element LD3 may be electrically connected to the third anode electrode AE3 and the cathode electrode CE. The third light-emitting element LD3 may be provided as a light-emitting element LD electrically connected to the sub-pixel circuit SPC of the third sub-pixel SP3.

The first light-emitting element LD1, the second light-emitting element LD2, and the third light-emitting element LD3 may be inorganic light-emitting diodes including inorganic light-emitting material. However, embodiments are not limited to the aforementioned example(s). For example, the first to third light-emitting elements LD1 to LD3 may be organic light-emitting diodes.

Figure 12:
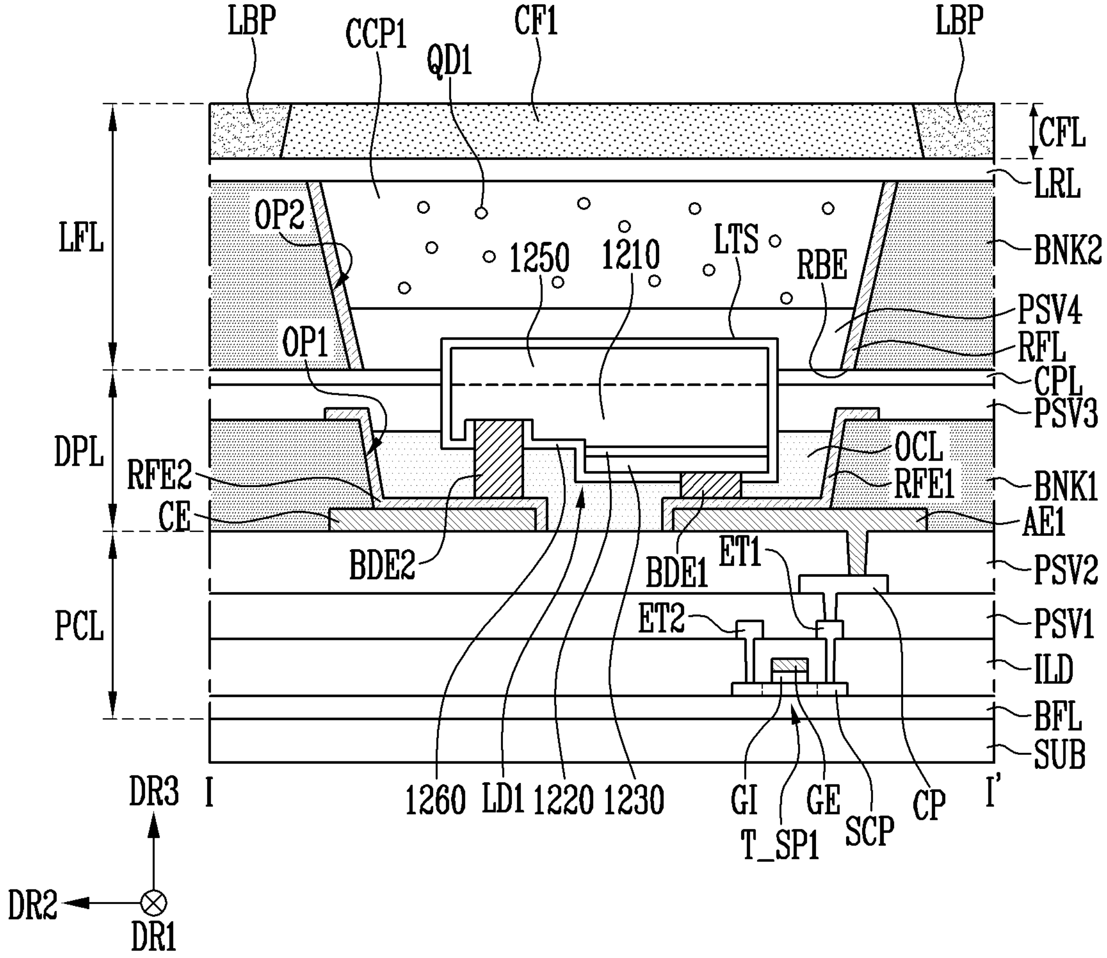
FIG. 12 schematically illustrates a cross-sectional view of the one pixel of FIG. 11 taken along sectional line I-I' according to some embodiments.

FIG. 12 schematically illustrates a cross-sectional view of the one pixel of FIG. 11 taken along sectional line I-I' according to some embodiments.

Referring to FIGS. 11 and 12, the pixel circuit layer PCL, the display element layer DPL, and the light functional layer LFL may be sequentially disposed on the substrate SUB in the third direction DR3.

The pixel circuit layer PCL may include insulating layers, active pattern layers, and conductive patterns that are stacked on the substrate SUB in the third direction DR3. The insulating layers may include a buffer layer BFL, a gate insulating layer GI, one or more interlayer insulating layers ILD, and one or more passivation layers (e.g., first and second via layers PSV1 and PSV2). The active pattern layers and the conductive patterns may be positioned between at least two of the insulating layers. The conductive patterns may include at least one material, such as at least one of copper (Cu), molybdenum (Mo), tungsten (W), aluminum-neodymium (AlNd), titanium (Ti), aluminum (Al), and silver (Ag).

As described with reference to FIG. 5, the sub-pixel circuit SPC may include one or more transistors and one or more capacitors. The active patterns and the conductive patterns of the pixel circuit layer PCL may function as the transistors and the capacitors of the sub-pixel circuit SPC. Furthermore, the conductive patterns of the pixel circuit layer PCL may also function as lines (e.g., transmission lines).

The buffer layer BFL may be disposed on a (e.g., one) surface of the substrate SUB, such as the upper surface of the substrate SUB. The buffer layer BFL may prevent impurities from diffusing into the circuit elements and the lines that are included in the pixel circuit layer PCL disposed above the substrate SUB. The buffer layer BFL may include an inorganic insulating layer including at least one inorganic material. In some embodiments, the buffer layer BFL may include at least one of silicon nitride ($SiN_x$), silicon oxide ($SiO_x$), silicon oxynitride ($SiO_xN_y$), and metal oxide, such as aluminum oxide ($AlO_x$). It is noted that x and y are natural numbers. The buffer layer BFL may be provided in the form of a single layer or multiple layers. In an embodiment in which the buffer layer BFL is provided in the form of a multilayer structure, the respective layers may be formed of a same material or different materials from at least one other layer of the respective layers.

In some embodiments, one or more barrier layers may be disposed between the substrate SUB and the buffer layer BFL. For example, each of the barrier layers may include polyimide.

A transistor T_SP1 may be disposed on the buffer layer BFL. The transistor T_SP1 may be any one of the transistors of the sub-pixel circuit SPC of the first sub-pixel SP1. For example, the transistor T_SP1 may correspond to the tenth transistor TR10 described with reference to FIG. 5.

The transistor T_SP1 may include a semiconductor layer SCP, a gate electrode GE, a first terminal ET1, and a second terminal ET2. The first terminal ET1 may be either a source electrode or a drain electrode, and the second terminal ET2 may be the other of the source electrode and the drain electrode. For example, the first terminal ET1 may be a source electrode, and the second terminal ET2 may be a drain electrode.

The semiconductor layer SCP may be disposed on the buffer layer BFL. The semiconductor layer SCP may include a first contact area electrically connected to the first terminal ET1, and a second contact area electrically connected to the second terminal ET2. An area between the first contact area and the second contact area may be a channel area. The channel area may overlap the gate electrode GE of the transistor T_SP1 in, for instance, the third direction DR3. The channel area may be an undoped semiconductor pattern, and may be an intrinsic semiconductor. Each of the first contact area and the second contact area may be a semiconductor pattern doped with an impurity. For example, a p-type impurity may be used as the impurity, but embodiments are not limited to p-type impurities. For instance, an n-type impurity may be used.

The semiconductor layer SCP may include any one of various types of semiconductors, for example, an amorphous silicon semiconductor, a monocrystalline silicon semiconductor, a polycrystalline silicon semiconductor, a low temperature polycrystalline silicon, or an oxide semiconductor.

The interlayer insulating layers ILD that are sequentially stacked on each other may be disposed on the semiconductor layer SCP. The interlayer insulating layers ILD may be formed of inorganic insulating layers including at least one inorganic material. For example, each of the interlayer insulating layers ILD may include at least one of silicon nitride ($SiN_x$), silicon oxide ($SiO_x$), silicon oxynitride ($SiO_xN_y$), and metal oxide, such as aluminum oxide ($AlO_x$)

where x and y are natural numbers. However, the material of the interlayer insulating layers ILD is not limited to the aforementioned example(s). For example, any one of the interlayer insulating layers ILD may include an organic insulating layer including at least one organic material. In some implementations, at least one of the interlayer insulating layers ILD may be formed of a different material than at least one other one of the interlayer insulating layers ILD.

The interlayer insulating layers ILD may electrically separate the conductive patterns and/or active pattern layers that are disposed between the interlayer insulating layers ILD from each other. For example, the interlayer insulating layers ILD may include a gate insulating layer GI disposed on the semiconductor layer SCP. The gate insulating layer GI may be disposed between the semiconductor layer SCP and the gate electrode GE such that the gate electrode GE is spaced apart from the semiconductor layer SCP. In some embodiments, the gate insulating layer GI may be provided on the overall surfaces of the semiconductor layer SCP and the buffer layer BFL, thus covering the semiconductor layer SCP and the buffer layer BFL. As the number of layers used to form the conductive patterns and/or the semiconductor patterns increases, the number of interlayer insulating layers ILD may increase.

The gate electrode GE may be disposed on the gate insulating layer GI. The gate electrode GE may overlap the channel area of the semiconductor layer SCP in, for example, the third direction DR3. In some embodiments, the gate electrode GE may be provided in the form of a single layer including at least one material, such as at least one of copper (Cu), molybdenum (Mo), tungsten (W), aluminum-neodymium (AlNd), titanium (Ti), aluminum (Al), and silver (Ag). In some embodiments, the gate electrode GE may be provided in the form of a multilayer structure including at least one material, such as at least one of molybdenum (Mo), titanium (Ti), copper (Cu), aluminum (Al), and silver (Ag) that are relatively low-resistance materials.

The first and second terminals ET1 and ET2 may be disposed on the interlayer insulating layers ILD. The first and second terminals ET1 and ET2 may be electrically connected to the semiconductor layer SCP through contact holes passing through one or more of the interlayer insulating layers ILD. The first and second terminals ET1 and ET2 may be respectively electrically connected to the source area and the drain area of the semiconductor layer SCP. Each of the first and second terminals ET1 and ET2 may include at least one material, such as at least one of copper (Cu), molybdenum (Mo), tungsten (W), aluminum-neodymium (AlNd), titanium (Ti), aluminum (Al), and silver (Ag).

In some embodiments, the transistor T_SP1 may be formed of a transistor including a relatively low temperature polycrystalline silicon semiconductor. However, embodiments are not limited to the aforementioned example(s). For example, the transistor T_SP1 may be formed of a transistor including an oxide semiconductor.

Although the transistor T_SP1 is shown and described as having a top gate structure, embodiments are not limited thereto. For example, the transistor T_SP1 may be a transistor having a bottom gate structure or a dual gate structure. According to some embodiments, the structure of the transistor T_SP1 may be changed in various ways.

At least some of the various lines for the display panel DP and/or the display device DD may be further disposed on the interlayer insulating layers ILD.

A first via layer PSV1 may be disposed on the first and second terminals ET1 and ET2. The via layer may be referred to as a passivation layer. The first via layer PSV1 may be configured to protect components disposed under the first via layer PSV1 and provide an even (or planar) upper surface.

A connection pattern CP may be disposed on the first via layer PSV1. The connection pattern CP may pass through the first via layer PSV1 and be electrically connected to the first terminal ET1 of the transistor T_SP1. The connection pattern CP may correspond to a portion of the second source-drain electrode layer SD2 forming the sixth node N6 described with reference to FIG. 6. The connection pattern CP may include at least one material, such as at least one of copper (Cu), molybdenum (Mo), tungsten (W), aluminum-neodymium (AlNd), titanium (Ti), aluminum (Al), and silver (Ag).

At least some of the various lines for the display panel DP and/or the display device DD may be further disposed on the first via layer PSV1.

A second via layer PSV2 may be disposed on both the connection pattern CP and the first via layer PSV1. The second via layer PSV2 may be configured to protect components disposed under the second via layer PSV2 and provide an even (e.g., planar) upper surface.

Each of the first and second via layers PSV1 and PSV2 may include an inorganic insulating layer including at least one inorganic material, and/or an organic insulating layer including at least one organic material. The inorganic insulating layer may include, for example, at least one of silicon oxide ($SiO_x$), silicon nitride ($SiN_x$), silicon oxynitride ($SiO_xN_y$), and metal oxide, such as aluminum oxide ($AlO_x$) where x and y are natural numbers. The organic insulating layer may include, for example, at least one of acrylic resin, epoxy resin, phenol resin, polyamide resin, polyimide rein, unsaturated polyester resin, poly-phenylene ether resin, poly-phenylene sulfide resin, and benzocyclobutene resin.

In an embodiment, each of the first and second via layers PSV1 and PSV2 may include a same material as any one of the interlayer insulating layers ILD. However, embodiments are not limited to the foregoing examples. Each of the first and second via layers PSV1 and PSV2 may be provided in the form of a single-layer structure, or may be provided in the form of a multilayer structure depending on a desired configuration. In some implementations, at least one of the first and second via layers PVS1 and PSV2 may have a single layer structure and the other of the first and second via layers PSV1 and PSV2 may have a multilayer structure.

The display element layer DPL may be disposed on the second via layer PSV2. The display element layer DPL may include the first anode electrode AE1, the cathode electrode CE, a first bank BNK1, first and second reflective electrodes RFE1 and RFE2, the first light-emitting element LD1, an overcoat layer OCL, a third via layer PSV3, and a capping layer CPL. In some implementations, the display element layer DPL may include one or more other or additional layers.

The first anode electrode AE1 and the cathode electrode CE may be disposed on the pixel circuit layer PCL.

The first anode electrode AE1 may be electrically connected to the connection pattern CP through a contact hole passing through the second via layer PSV2. As such, the first anode electrode AE1 may be electrically connected to the first transistor T_SP1.

The cathode electrode CE may be spaced apart from the first anode electrode AE1 in the second direction DR2. The cathode electrode CE may be electrically connected to the second power voltage node VSSN described in association with FIG. 3. Accordingly, a fourth power voltage VSS (refer to FIG. 4) applied to the second power voltage node VSSN may be transmitted to the cathode electrode CE.

The first bank BNK1 may be disposed on the first anode electrode AE1 and the cathode electrode CE. The first bank BNK1 may include a first opening OP1 through which at least some portions of the first anode electrode AE1 and the first cathode electrode CE may be exposed. The first light-emitting element LD1 may be disposed in the first opening OP1 of the first bank BNK1. As such, the first bank BNK1 may be provided as a pixel defining layer that defines (or at least partially bounds) an area where the first light-emitting element LD1 is positioned.

The first bank BNK1 may include a light blocking material to prevent (or at least mitigate) light mixture between adjacent sub-pixels SP. In some embodiments, the first bank BNK1 may include at least one organic material. For example, the first bank BNK1 may include at least one organic insulating material, such as at least one of acryl resin, epoxy resin, phenol resin, polyamide resin, polyimide resin, and the like.

The first reflective electrode RFE1 may be disposed on an exposed portion of the first anode electrode AE1 and a side surface of the first bank BNK1 adjacent to the first anode electrode AE1. The second reflective electrode RFE2 may be disposed on an exposed portion of the cathode electrode CE and a side surface of the first bank BNK1 adjacent to the cathode electrode CE. The first and second reflective electrodes RFE1 to RFE2 may include a conductive material(s) suitable for reflecting light. Consequently, the light output efficiency of the first light-emitting element LD1 may be enhanced. In some embodiments, the first and second reflective electrodes RFE1 and RFE2 may include at least one of aluminum (Al), silver (Ag), magnesium (Mg), platinum (Pt), palladium (Pd), gold (Au), nickel (Ni), neodymium (Nd), iridium (Ir), chromium (Cr), and titanium (Ti), or an alloy of two or more materials selected from among the aforementioned materials. However, embodiments are not limited thereto.

The first light-emitting element LD1 may be electrically connected to the first anode electrode AE1 through the first reflective electrode RFE1. The first light-emitting element LD1 may be electrically connected to the cathode electrode CE through the second reflective electrode RFE2. The first light-emitting element LD1 may be bonded (or coupled) to the first and second reflective electrodes RFE1 and RFE2. In some implementations, the first light-emitting element LD1 may be supported on (or by) the first and second reflective electrodes RFE1 and RFE2 and at least one other layer (e.g., overcoat layer OCL) may fix the position of the first light-emitting element LD1 relative to the first and second reflective electrodes RFE1 and RFE2.

The first light-emitting element LD1 may include a first semiconductor layer 1210, an active layer 1220, a second semiconductor layer 1230, and an auxiliary layer 1250. The first light-emitting element LD1 may include an emission stack in which the auxiliary layer 1250, the first semiconductor layer 1210, the active layer 1220, and the second semiconductor layer 1230 are sequentially stacked on each other in, for instance, the third direction DR3.

The first light-emitting element LD1 may include first and second bonding electrodes BDE1 and BDE2 oriented in a same direction (e.g., in a direction opposite to the third direction DR3). The first bonding electrode BDE1 may be electrically connected to the second semiconductor layer 1230. The second bonding electrode BDE2 may be electrically connected to the first semiconductor layer 1210 exposed by etching (or otherwise removing) respective portions of the second semiconductor layer 1230 and the active layer 1220. The first light-emitting element LD1 may be a flip-chip-type light-emitting element, but embodiments are not limited thereto.

The first semiconductor layer 1210 may be configured to provide electrons to the active layer 1220. The first semiconductor layer 1210 may include, for example, at least one n-type semiconductor layer. For example, the first semiconductor layer 1210 may include a semiconductor material, such as at least one of gallium nitride (GaN), aluminum gallium nitride (AlGaN), indium gallium nitride (InGaN), aluminum nitride (AlN), and indium nitride (InN), as an n-type semiconductor layer doped with a first conductive dopant (or n-type dopant), such as silicon (Si), germanium (Ge), or tin (Sn). However, the material for forming the first semiconductor layer 1210 is not limited to the aforementioned example(s), and various other or additional materials may be used to form the first semiconductor layer 1210. In an embodiment, the first semiconductor layer 1210 may include a gallium nitride (GaN) semiconductor material doped with a first conductive dopant (or an n-type dopant). In an embodiment, the first semiconductor layer 1210 along with the auxiliary layer 1250 may form an n-type semiconductor layer.

The active layer 1220 may be disposed on the first semiconductor layer 1210 and may provide an area where electrons and holes are recombined with each other. As electrons and holes are recombined with each other in the active layer 1220, the electrons and holes may transition to a relatively lower energy level, whereby light having a corresponding wavelength may be generated or otherwise emitted. The active layer 1220 may have a single or multi-quantum well structure. In an embodiment in which the active layer 1220 is formed having a multi-quantum well structure, parts each including a barrier layer, a strain reinforcing layer, and a well layer may be repeatedly stacked on each other to form the active layer 1220. However, embodiments of the active layer 1220 are not limited to those described above.

The second semiconductor layer 1230 may be disposed on the active layer 1220 and may provide holes to the active layer 1220. The second semiconductor layer 1230 may include a semiconductor layer of a type different from the first semiconductor layer 1210. For example, the second semiconductor layer 1230 may include at least one p-type semiconductor layer. For example, the second semiconductor layer 1230 may include at least one semiconductor material, such as at least one of gallium nitride (GaN), aluminum gallium nitride (AlGaN), indium gallium nitride (InGaN), aluminum nitride (AlN), and indium nitride (InN), and may be a p-type semiconductor layer doped with a second conductive dopant (or p-type dopant), such as magnesium (Mg), zinc (Zn), calcium (Ca), strontium (Sr), barium (Ba), or the like. However, the material for forming the second semiconductor layer 1230 is not limited to the aforementioned example(s), and various other or additional materials may be used to form the second semiconductor layer 1230. In an embodiment, the second semiconductor layer 1230 may include a gallium nitride (GaN) semiconductor material doped with a second conductive dopant (or a p-type dopant).

The auxiliary layer 1250 may include, for instance, an undoped gallium nitride (GaN) semiconductor material, and may form an n-type semiconductor layer along with the first semiconductor layer 1210. A dashed line is provided between the auxiliary layer 1250 and the first semiconductor layer 1210 to illustrate a demarcation between the auxiliary layer 1250 and the first semiconductor layer 1210. It is noted, however, that a continuum of variably doped gallium nitride (GaN) semiconductor material may exist between the auxiliary layer 1250 and the first semiconductor layer 1210. Whatever the case, the auxiliary layer 1250 may be characterized as undoped gallium nitride (GaN) semiconductor material.

The first bonding electrode BDE1 may be electrically connected to the second semiconductor layer 1230. The second bonding electrode BDE2 may be electrically connected to the first semiconductor layer 1210. The first and second bonding electrodes BDE1 and BDE2 may include eutectic metal.

The first light-emitting element LD1 may further include an insulating layer 1260 covering a circumferential outer surface of the emission stack. The insulating layer 1260 may be configured to prevent (or mitigate the chances of) the active layer 1220 from short-circuiting due to contact with another conductive material other than the first and second semiconductor layers 1210 and 1230. The insulating layer 1260 may include at least one transparent (or at least translucent) insulating material. The insulating layer 1260 may be configured such that lower surfaces of the first and second semiconductor layers 1210 and 1230 are exposed and allow the first and second bonding electrodes BDE1 and BDE2 to form respective connections with the first and second semiconductor layers 1210 and 1230.

The lower surface of the first bonding electrode BDE1 be electrically connected to the first reflective electrode RFE1. Accordingly, the first bonding electrode BDE1 may be electrically connected to the first anode electrode AE1 through the first reflective electrode RFE1. The lower surface of the second bonding electrode BDE2 be electrically connected to the second reflective electrode RFE2. Accordingly, the second bonding electrode BDE2 may be electrically connected to the cathode electrode CE through the second reflective electrode RFE2.

The overcoat layer OCL may be disposed in the first opening OP1 in which the first and second reflective electrodes RFE1 and RFE2 and the first light-emitting element LD1 are disposed. The overcoat layer OCL may secure the first light-emitting element LD1 in electrical contact with the first and second reflective electrodes RFE1 and RFE2 and prevent (or at least reduce the likelihood) of relative movement between the light-emitting element LD and at least one of the first and second reflective electrodes RFE1 and RFE2. Furthermore, the overcoat layer OCL may protect components disposed under the overcoat layer OCL from foreign substances, such as dust, water, moisture, etc. For example, the overcoat layer OCL may include at least one of an inorganic insulating layer and an organic insulating layer. For example, the overcoat layer OC may include epoxy resin, but embodiments are not limited thereto.

The third via layer PSV3 may be disposed on the first bank BNK1 and the overcoat layer OCL. The third via layer PSV3 may protect components disposed under the third via layer VIA3 and provide an even (or planar) upper surface. The third via layer PSV3 may include a same material as any one of the first and second via layers PSV1 and PSV2. However, embodiments are not limited to the aforementioned example(s). For instance, the third via layer VIA3 may be formed of a different material than at least one of the first and second via layers VIA1 and VIA2.

In some embodiments, the third via layer PSV3 may not be disposed on an upper surface LTS of the first light-emitting element LD1. The first light-emitting element LD1 may protrude into the light functional layer LFL. The first light-emitting element LD1 may be positioned at least partially in a second opening OP2 of a second bank BNK2. For example, a height of the upper surface LTS of the first light-emitting element LD1 from the substrate SUB in the third direction DR3 may be higher than that of a lowermost end RBE of the reflective layer RFL. Accordingly, light emitted from the first light-emitting element LD1 may be provided to the light functional layer LFL at a relatively high rate.

The capping layer CPL may be disposed on the third via layer PSV3. The capping layer CPL may protect components disposed under the capping layer CPL such as the first light-emitting element LD1 from external (or foreign) water, moisture, and/or the like. In some embodiments, the capping layer CPL may not be disposed on the upper surface LTS of the first light-emitting element LD1. In some implementations, the capping layer CPL may not cover one or more portions of one or more side (or lateral) surfaces of the first light-emitting element LD1. In some embodiments, the capping layer CPL may completely cover the first light-emitting element LD1 and the third via layer PSV3. The capping layer CPL may include at least one of silicon nitride ($SiN_x$), silicon oxide ($SiO_x$), silicon oxynitride ($SiO_xN_y$), and metal oxide, such as aluminum oxide ($AlO_x$) where x and y are natural numbers. However, embodiments of the capping layer CPL are not limited to the aforementioned example(s).

Hitherto, the pixel circuit layer PCL and the display element layer DPL of the first sub-pixel SP1 have been described. Each of the second and third sub-pixels SP2 and SP3 illustrated in FIG. 11 may also be configured in a same manner as the first sub-pixel SP1, unless otherwise described.

The light functional layer LFL may be disposed on the capping layer CPL. The light functional layer LFL may include the second bank BNK2, the reflective layer RFL, a fourth via layer PSV4, a first light conversion pattern CCP1, a low refractive layer LRL, a color filter layer CFL, and/or the like.

The second bank BNK2 may be disposed on the capping layer CPL. The second bank BNK2 may overlap the first bank BNK1 in, for example, the third direction DR3. The second bank BNK2 may have the second opening OP2 that overlaps the first opening OP1 in, for instance, the third direction DR3. In some implementations, central axes of the first and second openings OP1 and OP2 may be aligned with one another in the third direction DR3. It is also noted that, in some embodiments, the first and second openings OP1 and OP2 may be concentrically aligned with one another in a view in the third direction DR3. To this end, a cross-sectional area of the second opening OP2 in a first plane parallel to a DR1-DR2 plane may be greater than a cross-sectional area of the first opening OP1 in a second plane parallel to the DR1-DR2 plane.

The second bank BNK2 may include at least one light blocking material to prevent (or at least mitigate) light mixture between adjacent sub-pixels. In some embodiments, the second bank BNK2 may include organic material. For example, the second bank BNK2 may include at least one organic insulating material, such as at least one of acrylic resin, epoxy resin, phenol resin, polyamide resin, polyimide resin, and the like.

The reflective layer RFL may be disposed on sidewalls of the second bank BNK2 adjacent to (e.g., at least partially bounding) the second opening OP2. The reflective layer RFL may be configured to reflect incident light, thus enhancing the light output efficiency of the display panel DP. The reflective layer RFL may include any material suitable for reflecting light. The reflective layer RFL may include at least one of aluminum (Al), silver (Ag), magnesium (Mg), platinum (Pt), palladium (Pd), gold (Au), nickel (Ni), neodymium (Nd), iridium (Ir), chromium (Cr), and titanium (Ti), or an alloy of two or more of the aforementioned materials. However, embodiments are not limited thereto.

The fourth via layer PSV4 may be disposed on the capping layer CPL in the second opening OP2. The fourth via layer PSV4 may protect components disposed under the fourth via layer PSV4 and provide an even (or planar) upper surface. The fourth via layer PSV4 may include a same material as any one of the first to third via layers PSV1 to PSV3. However, embodiments are not limited to the aforementioned example(s). For instance, a material of the fourth via layer PSV4 may be different from the material of at least one of the first to third via layers PSV1 to PSV3.

The first light conversion pattern CCP1 may be disposed on the fourth via layer PSV4 in the second opening OP2.

The first light conversion pattern CCP1 may include color conversion particles and/or scattering particles. The color conversion particles may change the wavelength of incident light and convert the incident light into light of a different color. Furthermore, the color conversion particles may scatter the incident light. In some embodiments, the color conversion particles may be quantum dots, quantum rods, etc. The scattering particles may scatter incident light.

The first sub-pixel SP1 may be a red sub-pixel. In an implementation in which the first light-emitting element LD1 emits light of a blue color, the first light conversion pattern CCP1 may include first color conversion particles QD1 configured to convert light of a blue color into light of a red color. In an implementation in which the first light-emitting element LD1 emits light of a red color, the first light conversion pattern CCP1 may include scattering particles and may not include color conversion particles. As such, particles included in the first light conversion pattern CCP1 may be changed in various ways depending on the type of the first light-emitting element LD1.

The low refractive layer LRL may be disposed on the second bank BNK2, the reflective layer RFL, and the first light conversion pattern CCP1. The low refractive layer LRL may have a refractive index lower than the refractive index of the first light conversion pattern CCP1.

The low refractive layer LRL is configured to refract or totally reflect incident light depending on an incident angle of the corresponding incident light. For example, the low refractive layer LRL may provide light passing through the first light conversion pattern CCP1 to the first light conversion pattern CCP1 again. Accordingly, the light conversion efficiency of the first color conversion pattern CCP1 may be improved.

The color filter layer CFL may be disposed on the low refractive layer LRL. The color filter layer CFL may include the first color filter CF1 and light blocking patterns LBP. The first color filter CF1 may overlap the first light conversion pattern CCP1 in, for example, the third direction DR3. The first color filter CF1 allows light in a determined wavelength range to selectively pass through the first color filter CF1. In an embodiment in which the first sub-pixel SP1 is a red sub-pixel, the first color filter CF1 may include a red color filter. The light blocking patterns LBP may include at least one of various kinds of light blocking materials. Although described as light blocking patterns LBP, the light blocking patterns LBP may form portions of a same light blocking pattern and the first color filter CF1 may be disposed in an opening of that light blocking pattern including the light blocking patterns LBP.

Figure 13:
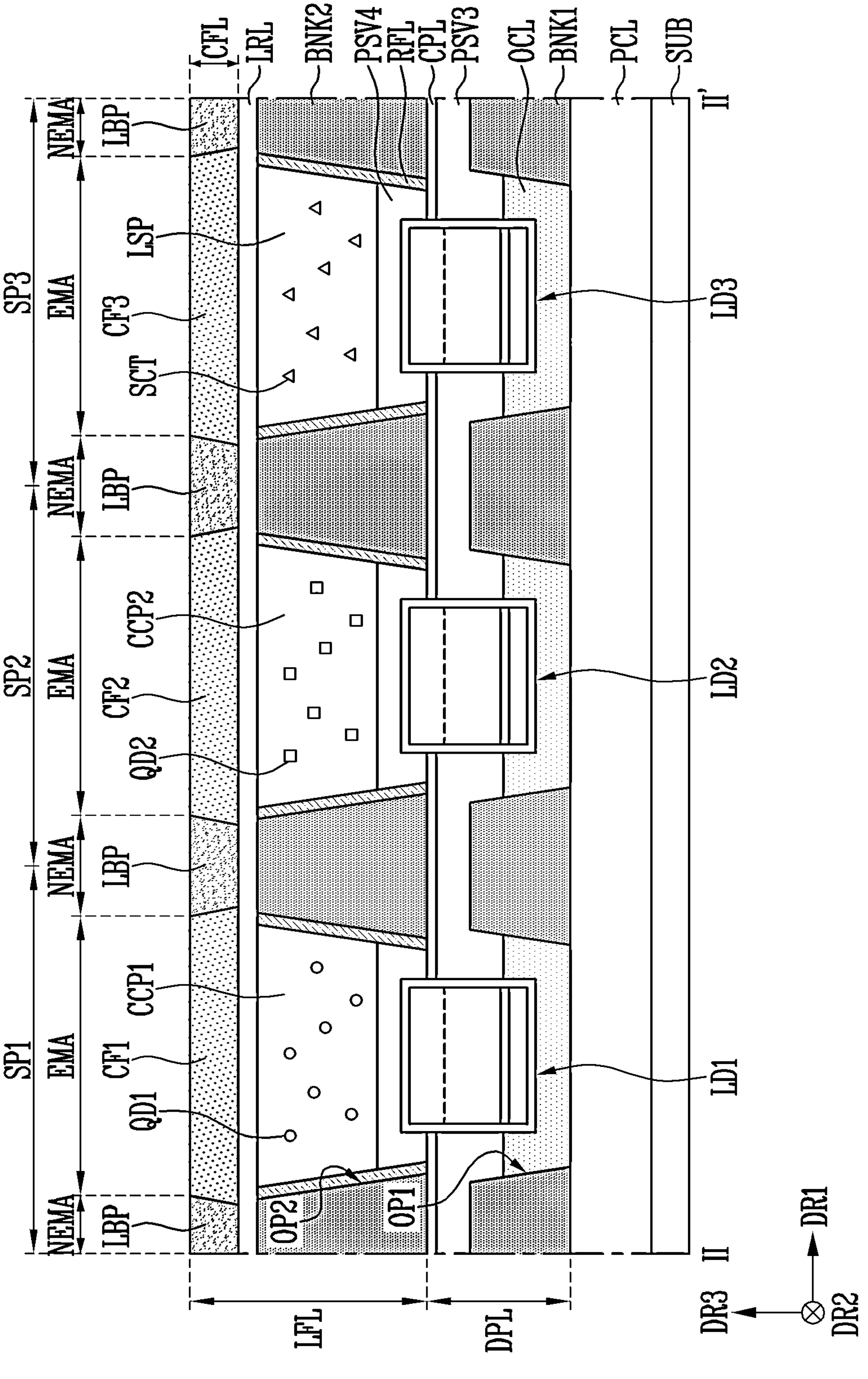
FIG. 13 schematically illustrates a cross-sectional view of the one pixel of FIG. 11 taken along sectional line II-II according to some embodiments.

FIG. 13 schematically illustrates a cross-sectional view of the one pixel of FIG. 11 taken along sectional line II-II' according to some embodiments.

Referring to FIGS. 11 and 13, the pixel circuit layer PCL, the display element layer DPL, and the light functional layer LFL may be sequentially disposed on the substrate SUB in the third direction DR3.

The pixel circuit layer PCL and the display element layer DPL may be the same as the pixel circuit layer PCL and the display element layer DPL described with reference to FIG. 12. Sub-pixel circuits respectively corresponding to the first to third sub-pixels SP1 to SP3 may be provided in the pixel circuit layer PCL. The first to third light-emitting elements LD1 to LD3 respectively corresponding to the first to third sub-pixels SP1 to SP3 may be provided in the display element layer DPL. The first to third light-emitting elements LD1 to LD3 may overlap first openings OP1 in the first bank BNK1 in, for example, the third direction DR3. The first light-emitting elements LD1 may be electrically connected between the cathode electrode CE (refer to FIG. 12) and the transistor T_SP1 (refer to FIG. 12) included in the sub-pixel circuit SPC of the first sub-pixel SP1. The second light-emitting element LD2 may be electrically connected between the cathode electrode CE and the transistor included in the sub-pixel circuit SPC of the second sub-pixel SP2. The third light-emitting element LD3 may be electrically connected between the cathode electrode CE and the transistor included in the sub-pixel circuit SPC of the third sub-pixel SP3. Hereinafter, repetitive explanations will be omitted.

The light functional layer LFL may be provided on the display element layer DPL. The light functional layer LFL may be the same as the light functional layer LFL described with reference to FIG. 12. Hereinafter, repetitive explanations will be omitted.

The second bank BNK2 may include second openings OP2. In this manner, the second openings OP2 in the second bank BNK2 may partially bound respective emission areas EMA of the first to third sub-pixels SP1 to SP3. A non-emission area NEMA for each of (or between) the first to third sub-pixels SP1 to SP3 may be formed in association with an area corresponding to the second bank BNK2. An area overlapping the second bank BNK2 in the third direction DR3 may correspond to the non-emission area NEMA. Areas overlapping the second openings OP2 of the second bank BNK2 in the third direction DR3 may correspond to the emission areas EMA of the first to third sub-pixels SP1 to SP3.

The fourth via layer PSV4 may be disposed on the capping layer CPL in the second openings OP2. First and second light conversion patterns CCP1 and CCP2 and a light scattering pattern LSP may be disposed on the fourth via layer PSV4 in the second openings OP2.

In some embodiments, the first to third light-emitting elements LD1 to LD3 may be configured to emit light of a blue color. The first light conversion pattern CCP1 may include first color conversion particles QD1 configured to convert light of a blue color into light of a red color. The second light conversion pattern CCP2 may include second color conversion particles QD2 configured to convert light of a blue color into light of a green color. The light scattering pattern LSP may include scattering particles SCT for scattering light of a blue color to enhance the light output efficiency of the display panel DP. Accordingly, the first to third sub-pixels SP1 to SP3 may be provided as a red sub-pixel, a green sub-pixel, and a blue sub-pixel, respectively. In some embodiments, at least one of the first and second light conversion patterns CCP1 and CCP2 and the light scattering pattern LSP may further include color conversion particles provided to convert light of a blue color into light of a white color.

In some embodiments, the first to third light-emitting elements LD1 to LD3 may be configured to emit light of a red color, a green color, and a blue color, respectively. Each of the first and second light conversion patterns CCP1 and CCP2 and the light scattering pattern LSP may include scattering particles SCT. As such, particles included in the first and second light conversion patterns CCP1 and CCP2 and the light scattering pattern LSP may be changed in various ways depending on the first to third light-emitting elements LD1 to LD3.

In some embodiments, the first and second light conversion patterns CCP1 and CCP2 and the light scattering pattern LSP may be omitted.

The low refractive layer LRL may be disposed on the second bank BNK2, the reflective layer RFL, the first light conversion pattern CCP1, the second light conversion pattern CCP2, and the light scattering pattern LSP. The low refractive layer LRL may have a refractive index lower than the refractive index of each of the first and second light conversion patterns CCP1 and CCP2 and the light scattering pattern LSP. In some embodiments, the low refractive layer LRL may be omitted in an area corresponding to the third sub-pixel SP3 or an area overlapping, in the third direction DR3, the second opening OP2 formed in association with the third sub-pixel SP3.

The color filter layer CFL may be disposed on the low refractive layer LRL. The color filter layer CFL may include first to third color filters CF1 to CF3 and light blocking patterns LBP.

Each of the first to third color filters CF1 to CF3 may allow light in a determined wavelength range to selectively pass through the corresponding one of the first to third color filters CF1 to CF3. In an embodiment in which the first sub-pixel SP1 is a red sub-pixel, the first color filter CF1 may include a red color filter. In an implementation in which the second sub-pixel SP2 is a green sub-pixel, the second color filter CF2 may include a green color filter. In an embodiment in which the third sub-pixel SP3 is a blue sub-pixel, the third color filter CF3 may include a blue color filter. Each of the first to third color filters CF1 to CF3 may have a refractive index higher than the refractive index of the low refractive layer LRL. However, embodiments are not limited to the foregoing example(s). For example, at least one of the first to third color filters CF1 to CF3 may have a refractive index equal to or lower than the refractive index of the low refractive layer LRL.

The light blocking patterns LBP may be disposed between the first to third color filters CF1 to CF3. The emission area (or light output area) EMA and the non-emission area NEMA for each of the first to third sub-pixels SP1 to SP3 may be at least partially bounded by the light blocking patterns LBP. An area overlapping the light blocking patterns LBP in the third direction DR3 may correspond to the non-emission area NEMA. An area that does not overlap the light blocking patterns LBP in the third direction DR3 may correspond to the emission area EMA.

In some embodiments, the light blocking patterns LBP may include at least one of various kinds of light blocking materials. In some embodiments, each of the light blocking patterns LBP may be provided in the form of a multilayer structure in which portions of at least two color filters among the first to third color filters CF1 to CF3 overlap each other in, for instance, the third direction DR3. For example, each of the light blocking patterns LBP may be formed by overlapping respective portions of the first to third color filters CF1 to CF3 in the third direction. In some implementations, a light blocking pattern between the first and second color filters CF1 and CF2 among the light blocking patterns LBP may be formed of a multilayer structure in which respective portions of the first and second color filters CF1 and CF2 overlap each other in the third direction DR3. A light blocking pattern between the second and third color filters CF2 and CF3 among the light blocking patterns LBP may be formed of a multilayer structure in which respective portions of the second and third color filters CF2 and CF3 overlap each other in the third direction DR3. A light blocking pattern between the first color filter CF1 and a third color filter CF3 of a neighboring pixel may be formed of a multilayer structure in which respective portions of the first and third color filters CF1 and CF3 overlap each other in the third direction DR3. As such, each of the first to third color filters CF1 to CF3 may extend to the non-emission area NEMA, thus forming the light blocking patterns LBP.

Figure 14:
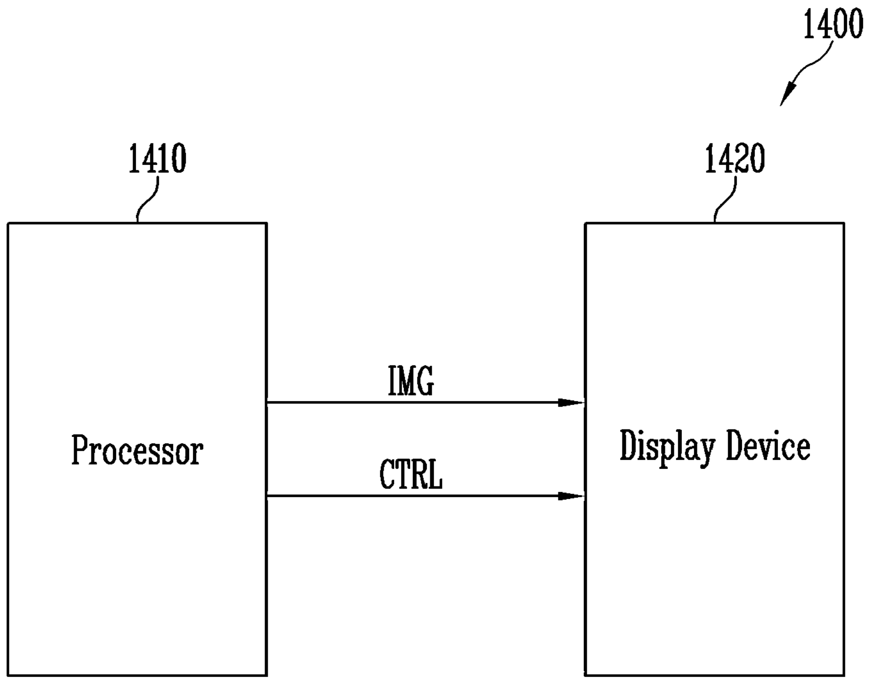
FIG. 14 schematically illustrates a block diagram of a display system according to some embodiments.

FIG. 14 schematically illustrates a block diagram of a display system 1400 according to some embodiments.

Referring to FIG. 14, the display system 1400 may include a processor 1410 and a display device 1420. Although only one processor 1410 and only one display device 1420 are shown, embodiments are not limited thereto. For instance, the display system 1400 may include multiple processors 1410 and/or multiple display devices 1420. The multiple processors 1410 and/or the multiple display devices 1420 may function as portions of a whole and/or may function individually. For convenience, it will be assumed that the display system 1400 includes one processor 1410 and one display device 1420.

The processor 1410 may perform various tasks and operations. In some embodiments, the processor 1410 may include an application processor, a graphic processor, a microprocessor, a central processing unit (CPU), and/or the like. The processor 1410 may be communicatively connected to the other components of the display system 1400 through a bus system to allow the processor 1410 to control the components.

The processor 1410 may transmit image data IMG and a control signal CTRL to the display device 1420. The display device 1420 may display an image based on the image data IMG and the control signal CTRL. The display device 1420 may be configured in a same manner as the display device DD described with reference to FIG. 1. The image data IMG and the control signal CTRL may be provided as the input image data IMG and the control signal CTRL described in association with FIG. 1, respectively.

The display system 1400 may include a computing system that may provide an image display function, such as at least one of a smart watch, a mobile phone, a smart phone, a portable computer, a tablet personal computer (tablet PC), a watch phone, an automotive display, a billboard, smart glasses, a portable multimedia player (PMP), a navigation system, and an ultra-mobile personal computer (UMPC). In some embodiments, the display system 1400 may include at least one of a head mounted display (HMD), a virtual reality (VR) device, a mixed reality (MR) device, and an augmented reality (AR) device.

FIGS. 15 to 18 schematically illustrate respective perspective views of various display systems 1400 according to some embodiments.

Figure 15:
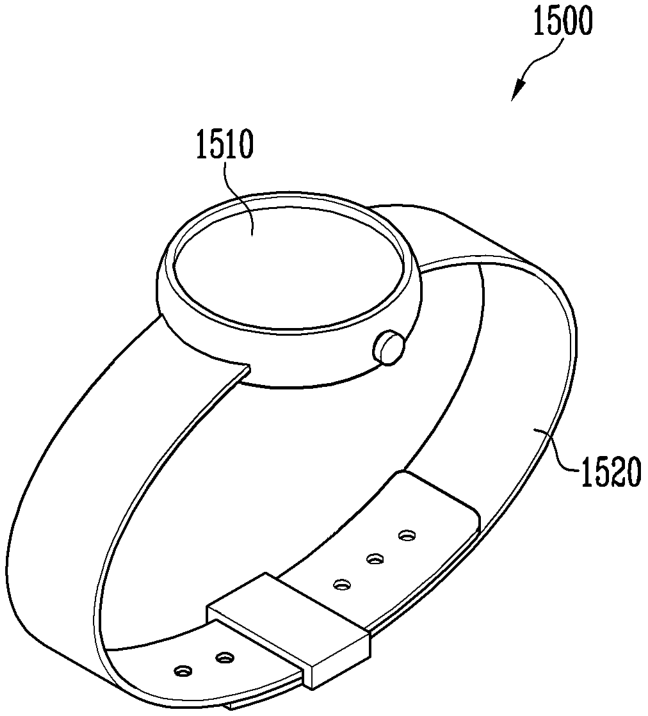
FIGS. 15, 16, 17, and 18 schematically illustrate respective perspective views of various display systems according to some embodiments.

Referring to FIG. 15, the display system 1400 described with reference to FIG. 14 may be applied to (or implemented as) a smart watch 1500 including a display component 1510 and a strap 1520.

The smart watch 1500 may be a wearable electronic device. For example, the smart watch 1500 may have a structure in which the strap 1520 may be mounted on the wrist of a user. Here, the display system 1400 and/or the display device 1420 may be applied as the display component 1510 so that image data including time information can be provided to the user.

Figure 16:
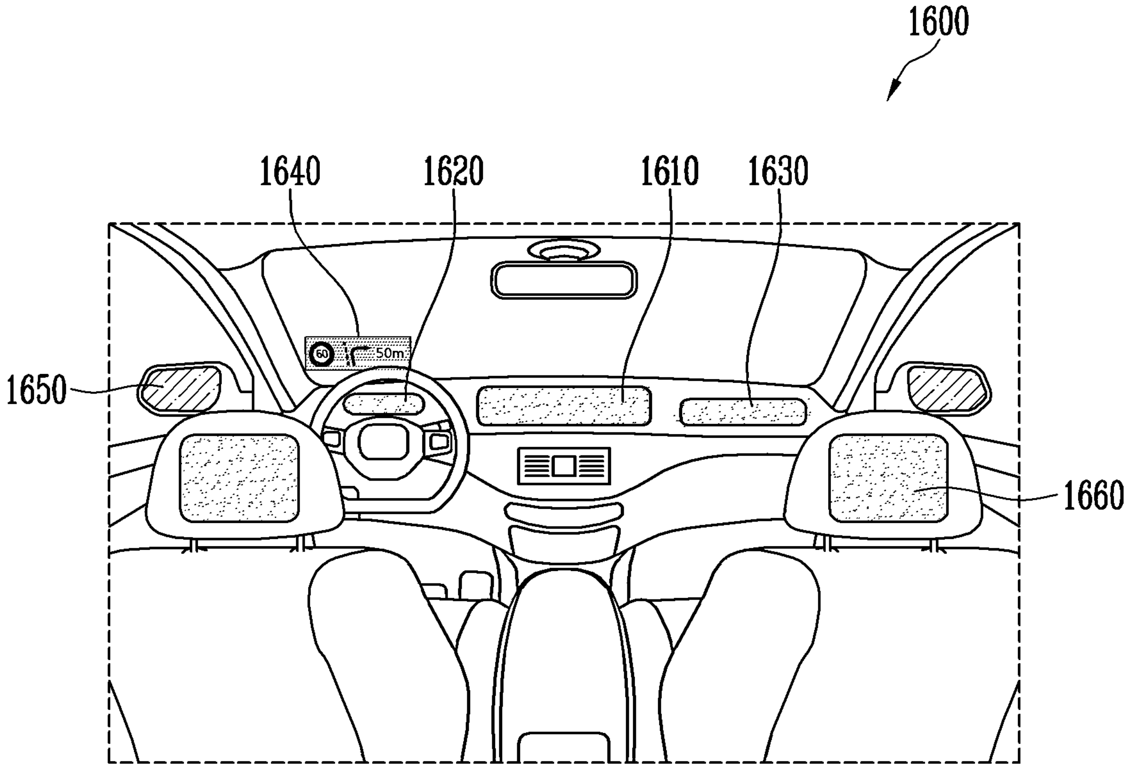

Referring to FIG. 16, the display system 1400 described with reference to FIG. 14 may be applied to (or implemented as) an automotive display system 1600. Here, the automotive display system 1600 may include a computing system that is provided inside and/or outside a vehicle to provide image data.

For example, the display system 1400 and/or the display device 1420 may be applied as at least any one of an infotainment panel 1610, a cluster 1620, a co-driver (or passenger) display 1630, a head-up display 1640, a side mirror display 1650, and a rear seat display 1660, which may be provided in, on, or projected from the vehicle.

Figure 17:
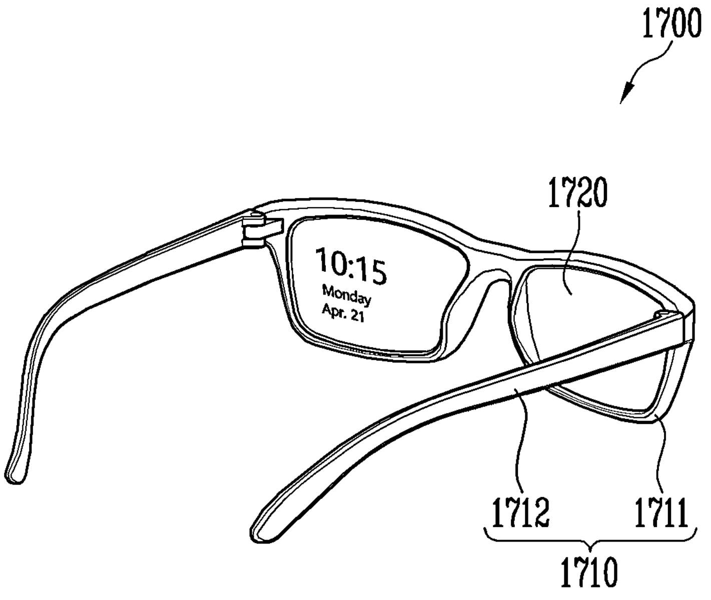

Referring to FIG. 17, the display system 1400 described with reference to FIG. 14 may be applied to smart glasses 1700. The smart glasses 1700 may be a wearable electronic device capable of being worn on the head of a user. For example, the smart glasses 1700 may be a wearable device for augmented reality.

The smart glasses 1700 may include a frame 1710 and a lens component 1720. The frame 1710 may include a housing 1711 that supports the lens component 1720, and a leg component 1712 enabling the user to wear the smart glasses. The leg component 1712 may extend from (e.g., may be moveably connected to) the housing 1711 via a hinge, and thus, can be folded or unfolded with respect to the housing 1711.

The frame 1710 may be equipped with a battery, a touch pad, a microphone, a camera, and/or the like. Furthermore, the frame 1710 may be equipped with a projector configured to output light, and a processor configured to control a light signal and/or the like.

The lens component 1720 may include an optical component configured to transmit or reflect light. For example, the lens component 1720 may include glass, optically transparent (or translucent) synthetic resin, and/or the like.

To enable the eyes of the user to perceive visual information, the lens component 1720 may reflect images by an optical signal transmitted from the projector of the frame 1710 by a rear surface of the lens component 1720 (e.g., a surface facing the eyes of the user). For example, the user may perceive visual information such as the time and date displayed on the lens component 1720 as shown in FIG. 17. The projector and/or the lens component 1720 may be a kind of display device. The display device 1420 (refer to FIG. 14) may be applied as the projector and/or the lens component 1720.

Figure 18:
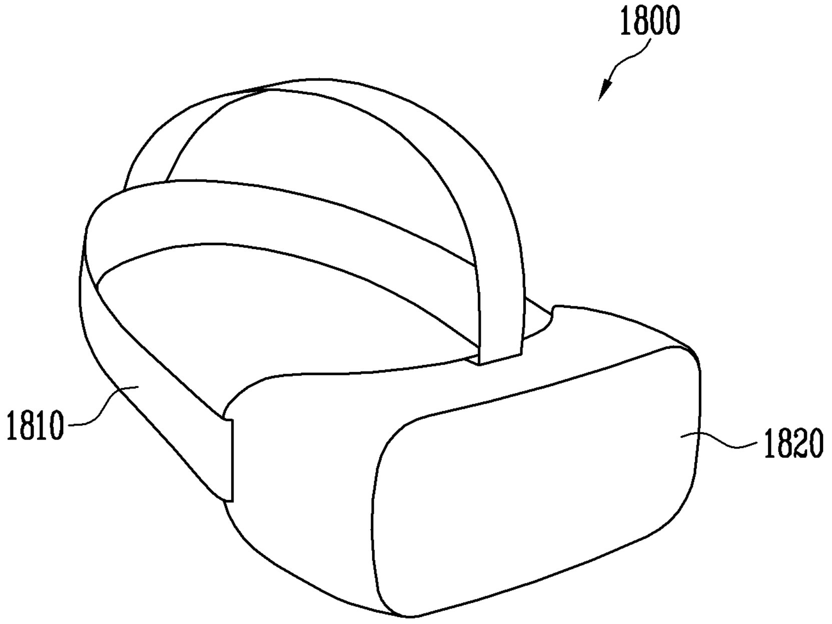

Referring to FIG. 18, the display system 1400 described in conjunction with FIG. 14 may be applied to (or implemented as) a head mounted display device 1800.

The head mounted display device 1800 may be a wearable electronic device, which can be worn on the head of a user. For example, the head mounted display device 1800 may be a wearable device for virtual reality or mixed reality.

The head mounted display 1800 may include a head mounted band 1810 and a display device reception casing 1820. The head mounted band 1810 may extend from (e.g., may be structurally connected to) the display device reception casing 1820. The head mounted band 1810 may include a horizontal band and/or a vertical band to fasten the head mounted display 1800 to the head of the user. The horizontal band may enclose the sides of the head of the user, and the vertical band may enclose the top of the head of the user. However, embodiments are not limited to the aforementioned example(s). For example, the head mounted band 1810 may be implemented in the form of eyeglass frames, a helmet, and/or the like.

The display device reception casing 1820 may receive and/or support the display system 1400 and/or the display device 1420.

In a display panel and a display system including the display panel according to various embodiments, a power line and sub-pixels may be efficiently arranged. This may allow a pixel density to be increased, and thereby, improve a resolution of the display panel and display system including the display panel.

Although the foregoing embodiments have been described in some detail for purposes of clarity of understanding, it will be apparent that certain changes and modifications may be practiced within the scope of the appended claims. It should be noted that there are many alternative ways of implementing the processes, systems, and apparatuses of the disclosed embodiments. Accordingly, embodiments are to be considered illustrative and not as restrictive, and embodiments are not to be limited to the details given herein.

What is claimed is:

1. A display panel comprising:

a first sub-pixel configured to emit light in a first range of wavelengths;

a second sub-pixel positioned in a first direction from the first sub-pixel, the second sub-pixel being configured to emit light in a second range of wavelengths different from the first range of wavelengths;

a 2a-th power line extending in the first direction and respectively overlapping both the first sub-pixel and the second sub-pixel in a third direction transverse to the first direction, the 2a-th power line comprising a bridge pattern extending from the 2a-th power line in a second direction transverse to both the first direction and the third direction, the 2a-th power line being electrically connected to the first sub-pixel through the bridge pattern; and a 2b-th power line bypassing the bridge pattern and extending in the first direction, the 2b-th power line respectively overlapping both the first sub-pixel and the second sub-pixel in the third direction, the 2b-th power line being electrically connected to the second sub-pixel.

2. The display panel of claim 1, wherein the 2a-th power line and the 2b-th power line are adjacent to each other in the second direction.

3. The display panel of claim 1, wherein both the 2a-th power line and the 2b-th power line are configured to apply power voltages of different levels to the first sub-pixel and the second sub-pixel, respectively.

4. The display panel of claim 1, further comprising:

a gate line extending in the first direction, the gate line being electrically connected to both the first sub-pixel and the second sub-pixel, wherein the gate line is positioned between the 2a-th power line and the 2b-th power line in the second direction.

5. The display panel of claim 4, wherein the bridge pattern overlaps a portion of the gate line in the third direction.

6. The display panel of claim 1, wherein the 2a-th power line is not electrically connected to the second sub-pixel, and the 2b-th power line is not electrically connected to the first sub-pixel.

7. The display panel of claim 1, wherein both the first sub-pixel and the second sub-pixel respectively comprises:

a pulse width modulation circuit configured to generate an emission control signal having a pulse width corresponding to a data signal;

a connection electrode electrically connected to the pulse width modulation circuit, the connection electrode being configured to receive the emission control signal;

a pixel driving circuit electrically connected to the connection electrode, the pixel driving circuit being configured to generate a driving current during a period corresponding to the pulse width of the emission control signal; and a light-emitting element electrically connected between the pixel driving circuit and a fourth power line different from the 2a-th power line and the 2b-th power line, the light-emitting element being configured to emit light in response to a flow of the driving current, the 2a-th power line is electrically connected to the pulse width modulation circuit of the first sub-pixel, and the 2b-th power line is electrically connected to the pulse width modulation circuit of the second sub-pixel.

8. The display panel of claim 7, wherein the pulse width modulation circuit comprises:

a first transistor comprising a gate electrode electrically connected to a first node, the first transistor being electrically connected between a second node and a third node;

a second transistor comprising a gate electrode electrically connected to a first gate line, the second transistor being configured to switch electrical connection between the third node and a data line;

a third transistor comprising a gate electrode electrically connected to the first gate line, the third transistor being configured to switch electrical connection between the first node and the second node;

a fourth transistor comprising a gate electrode electrically connected to an emission control line, the fourth transistor being configured to switch electrical connection between a first power line and the third node, the first power line being different from each of the 2a-th power line, the 2b-th power line, and the fourth power line;

a fifth transistor comprising a gate electrode electrically connected to the emission control line, the fifth transistor being configured to switch electrical connection between the second node and a fourth node; and a sixth transistor comprising a gate electrode electrically connected to a second gate line different from the first gate line, the sixth transistor being configured to switch electrical connection between the first node and a fifth node, the 2a-th power line is electrically connected to the fifth node of the first sub-pixel, and the 2b-th power line is electrically connected to the fifth node of the second sub-pixel.

9. The display panel of claim 8, wherein each of the first transistor, the fourth transistor, and the fifth transistor respectively comprises a semiconductor layer forming a corresponding portion of a first active pattern layer, each of the second transistor, the third transistor, and the sixth transistor respectively comprises a semiconductor layer forming a corresponding portion of a second active pattern layer different from the first active pattern layer, the first active pattern layer comprises a P-type semiconductor layer, and the second active pattern layer comprises an N-type semiconductor layer.

10. The display panel of claim 8, wherein the connection electrode is electrically connected to the fourth node.

11. The display panel of claim 9, wherein the pulse width modulation circuit comprises a first capacitor, and the first capacitor comprises a first electrode connected to the first node, and a second electrode connected to a sweep line.

12. The display panel of claim 11, wherein the pixel driving circuit comprises:

a seventh transistor comprising a gate electrode electrically connected to the fourth node, the seventh transistor being electrically connected to a sixth node;

an eighth transistor comprising a gate electrode electrically connected to the emission control line, the eighth transistor being configured to switch electrical connection between a third power line and the seventh transistor, the third power line being different from each of the first power line, the 2a-th power line, the 2b-th power line, and the fourth power line;

a ninth transistor comprising a gate electrode electrically connected to a third gate line different from both the first gate line and the second gate line, the ninth transistor being configured to switch electrical connection between the fourth node and the fifth node;

a tenth transistor comprising a gate electrode electrically connected to a fourth gate line, the tenth transistor being configured to switch electrical connection between a fifth power line and the sixth node, the fifth power line being different from each of the first power line, the 2a-th power line, the 2b-th power line, the third power line, and the fourth power line;

a second capacitor comprising a first electrode electrically connected to the third power line, and a second electrode electrically connected to the fourth node; and a third capacitor comprising a first electrode electrically connected to the fourth node, and a second electrode electrically connected to the sixth node.

13. The display panel of claim 12, wherein each of the seventh transistor, the eighth transistor, and the tenth transistor respectively comprises a semiconductor layer forming a corresponding portion of the first active pattern layer, and the ninth transistor comprises a semiconductor layer forming a corresponding portion of the second active pattern layer.

14. The display panel of claim 12, wherein each of the first gate line, the second gate line, and the third gate line forms a corresponding portion of a gate electrode layer, each of the fourth gate line, the first power line, the 2a-th power line, the 2b-th power line, the sweep line, and the emission control line forms a corresponding portion of a first source-drain electrode layer disposed on the gate electrode layer, and each of the data line, the fourth power line, and the fifth power line forms a corresponding portion of a second source-drain electrode layer disposed on the first source-drain electrode layer.

15. The display panel of claim 7, wherein the pulse width modulation circuit and the pixel driving circuit are adjacent to each other in the second direction, and the connection electrode extends in the second direction and respectively overlaps both the 2a-th power line and the 2b-th power line in the third direction.

16. The display panel of claim 7, wherein the light-emitting element comprises a flip-chip-type light-emitting element.

17. The display panel of claim 1, wherein the bridge pattern extending from the 2a-th power line comprises a first bridge pattern, the display panel further comprises:

a third sub-pixel positioned in a first direction from the second sub-pixel, the third sub-pixel being configured to emit light in a third range of wavelengths different from both the first range of wavelengths and the second range of wavelengths; and a 3a-th power line extending in the first direction and respectively overlapping each of the first sub-pixel, the second sub-pixel, and the third sub-pixel in the third direction, the 3a-th power line being different from both the 2a-th power line and the 2b-th power line, the 3a-th power line comprising a second bridge pattern extending from the 3a-th power line in the second direction and being electrically connected to the third sub-pixel through the second bridge pattern, and the 2b-th power line extends in the first direction and bypasses both the first bridge pattern and the second bridge pattern.

18. The display panel of claim 17, wherein the first sub-pixel, the second sub-pixel, and the third sub-pixel are sequentially adjacent to each other in the first direction.

19. The display panel of claim 17, wherein the first sub-pixel, the third sub-pixel, and the second sub-pixel are sequentially adjacent to each other in the first direction.

20. A display system comprising:

a processor configured to provide both image data and a control signal; and a display device comprising a display panel configured to:

receive the image data and the control signal, and display an image corresponding to the image data in response to the control signal, wherein the display panel comprises:

a first sub-pixel configured to emit light in a first range of wavelengths;

a second sub-pixel positioned in a first direction from the first sub-pixel, the second sub-pixel being configured to emit light in a second range of wavelengths different from the first range of wavelengths;

a 2a-th power line extending in the first direction and respectively overlapping both the first sub-pixel and the second sub-pixel in a third direction transverse to the first direction, the 2a-th power line comprising a bridge pattern extending from the 2a-th power line in a second direction transverse to both the first direction and the third direction, the 2a-th power line being electrically connected to the first sub-pixel through the bridge pattern; and a 2b-th power line bypassing the bridge pattern and extending in the first direction, the 2b-th power line respectively overlapping both the first sub-pixel and the second sub-pixel in the third direction, the 2b-th power line being electrically connected to the second sub-pixel.

* * * * *